United States Patent
Sen

(10) Patent No.: US 9,251,765 B2
(45) Date of Patent: Feb. 2, 2016

(54) IMAGE PROCESSING DEVICE, IMAGE PROCESSING METHOD, AND PROGRAM FOR GENERATING COMPOSITE IMAGE

(71) Applicant: Sony Corporation, Tokyo (JP)

(72) Inventor: Seigo Sen, Tokyo (JP)

(73) Assignee: SONY CORPORATION, Tokyo (JP)

( * ) Notice: Subject to any disclaimer, the term of this patent is extended or adjusted under 35 U.S.C. 154(b) by 360 days.

(21) Appl. No.: 13/688,902

(22) Filed: Nov. 29, 2012

(65) Prior Publication Data
US 2013/0162672 A1 Jun. 27, 2013

(30) Foreign Application Priority Data
Dec. 21, 2011 (JP) .................. 2011-279199

(51) Int. Cl.
*G09G 5/14* (2006.01)
*G09G 5/377* (2006.01)
(Continued)

(52) U.S. Cl.
CPC .............. *G09G 5/377* (2013.01); *G06T 11/60* (2013.01); *G09G 5/393* (2013.01); *G09G 5/397* (2013.01); *H04N 1/00161* (2013.01); *H04N 1/00167* (2013.01); *H04N 5/23293* (2013.01); *H04N 5/272* (2013.01); *H04N 5/445* (2013.01); *H04N 21/4223* (2013.01); *H04N 21/42661* (2013.01); *H04N 21/431* (2013.01); *H04N 21/4316* (2013.01); *H04N 21/4363* (2013.01); *H04N 21/44008* (2013.01); *H04N 21/440263* (2013.01); *H04N 21/8153* (2013.01); *G09G 2340/10* (2013.01); *G09G 2340/12* (2013.01); *H04N 2101/00* (2013.01)

(58) Field of Classification Search
CPC ....................................................... G09G 5/377
USPC ................................................. 345/629, 637
See application file for complete search history.

(56) References Cited

U.S. PATENT DOCUMENTS

2005/0271279 A1* 12/2005 Fujimura et al. .............. 382/203
2007/0146528 A1* 6/2007 Yanagi ..................... 348/333.01
(Continued)

FOREIGN PATENT DOCUMENTS

| EP | 2091232 A2 * | 8/2009 |
|---|---|---|
| JP | 2005-217978 | 8/2005 |
| JP | 2011-96134 | 5/2011 |

*Primary Examiner* — Weiming He
(74) *Attorney, Agent, or Firm* — Hazuki International, LLC

(57) ABSTRACT

An image processing device includes a composite processing unit that generates a composite image for display by including a through image generated based on a captured image signal obtained by performing photoelectric conversion for light incident from a subject in an image for a compositing process and composites a captured image of a recording time point in the image for a compositing process in accordance with a compositing arrangement state of the through image in the composite image for display, and a display control unit that performs display control for the composite image for display.

17 Claims, 17 Drawing Sheets

(51) Int. Cl.
*G09G 5/393* (2006.01)
*G09G 5/397* (2006.01)
*H04N 5/232* (2006.01)
*H04N 5/272* (2006.01)
*H04N 5/445* (2011.01)
*H04N 1/00* (2006.01)
*G06T 11/60* (2006.01)
*H04N 21/4223* (2011.01)
*H04N 21/426* (2011.01)
*H04N 21/431* (2011.01)
*H04N 21/4363* (2011.01)
*H04N 21/44* (2011.01)
*H04N 21/4402* (2011.01)
*H04N 21/81* (2011.01)
*H04N 101/00* (2006.01)

(56) References Cited

U.S. PATENT DOCUMENTS

2009/0092334 A1* 4/2009 Shulman et al. ............... 382/284
2009/0160969 A1* 6/2009 Kuroiwa .................... 348/223.1
2009/0322897 A1* 12/2009 Park ........................... 348/222.1

* cited by examiner

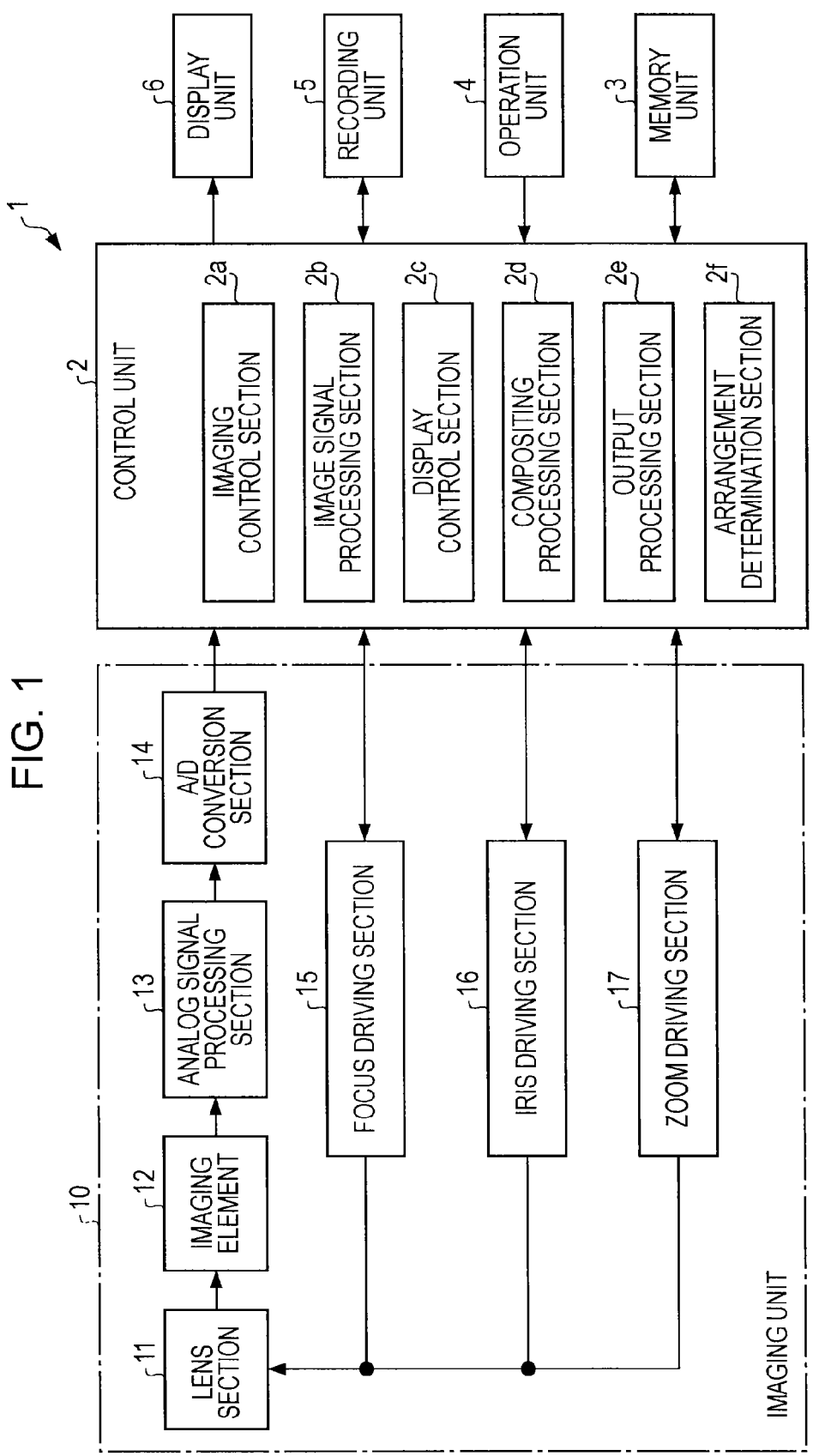

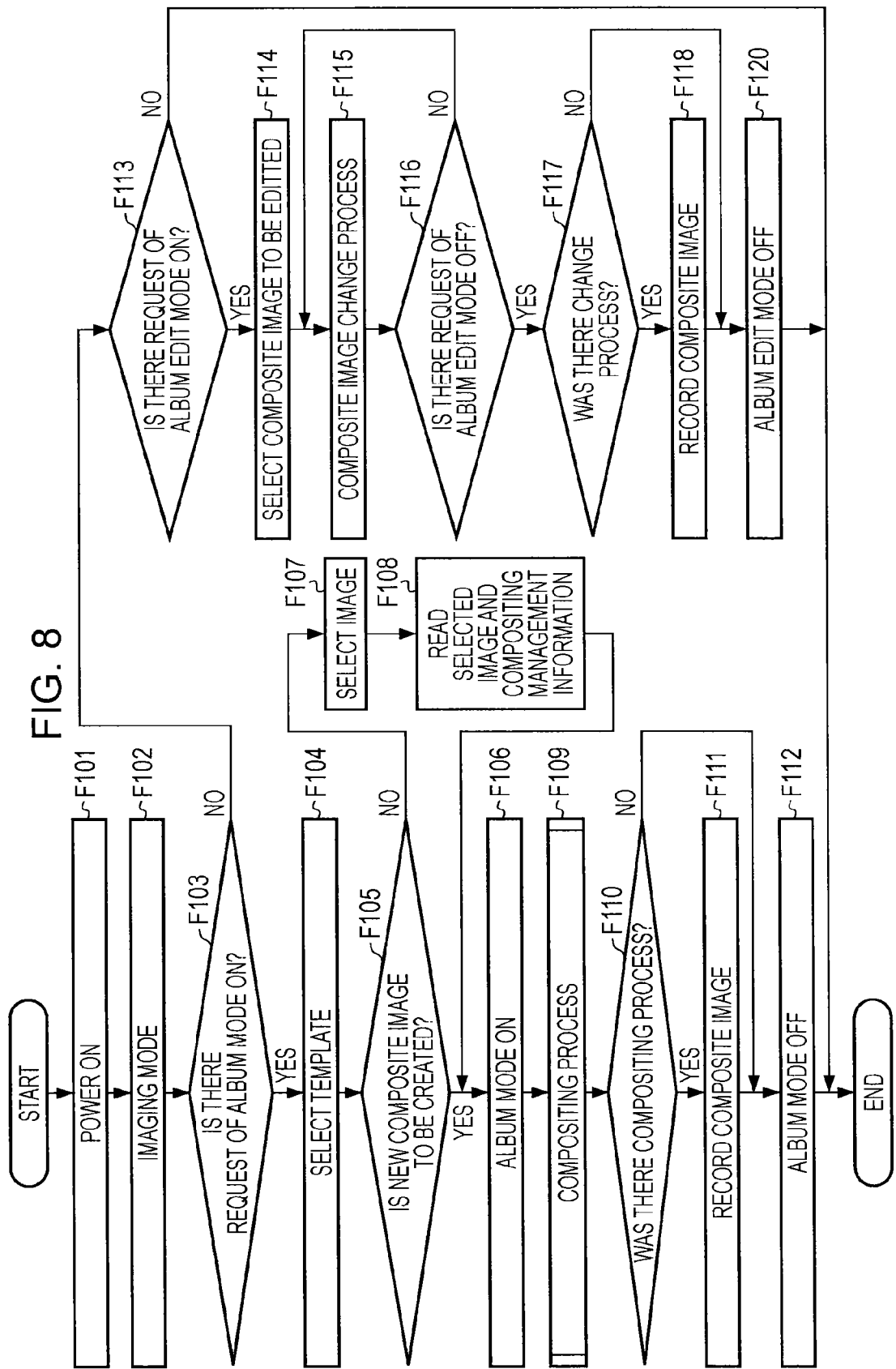

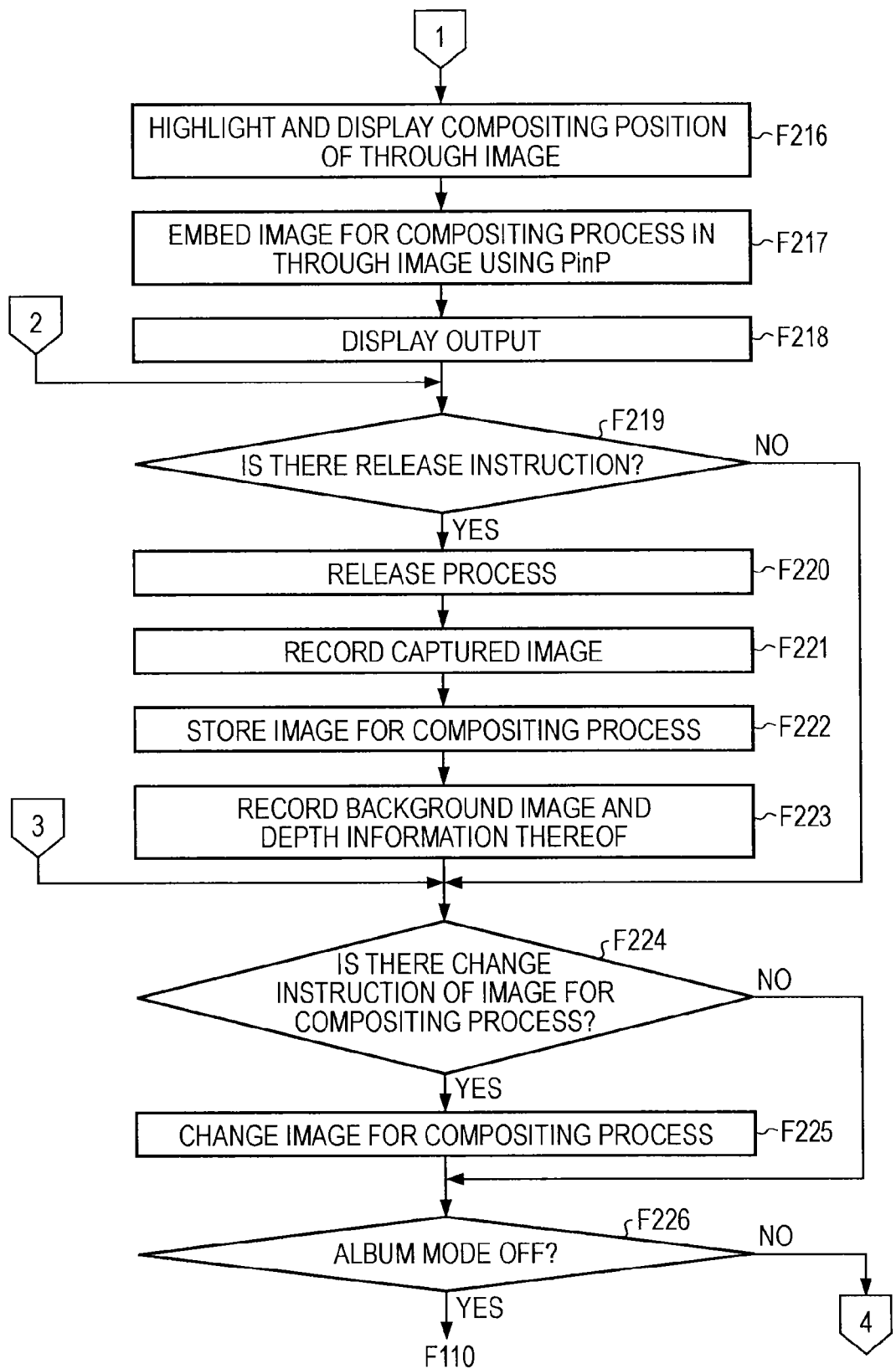

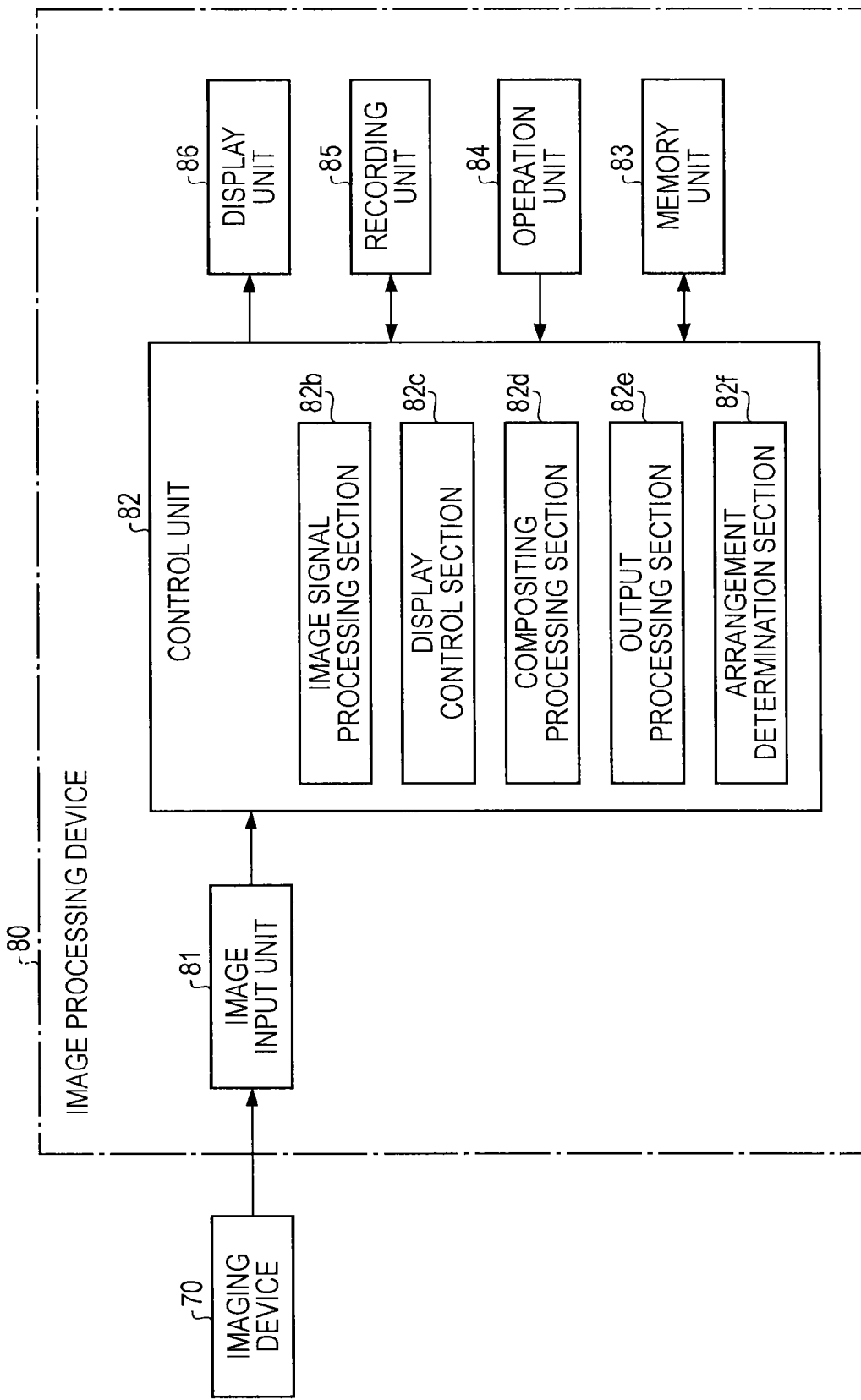

IMAGE PROCESSING DEVICE, IMAGE PROCESSING METHOD, AND PROGRAM FOR GENERATING COMPOSITE IMAGE

BACKGROUND

The present disclosure relates to an image processing device that enables the generation of a composite image, an image processing method thereof, and a program for generating a composite image.

As a function to enhance added value of a digital camera, there is a function of generating a composite image by compositing a plurality of still images that are imaged and recorded.

As a technology relating to a composite image in the related, a technology of displaying a whole image and face images of individual subjects so as to be seen at the same time has been proposed as disclosed in Japanese Unexamined Patent Application Publication No. 2011-96134.

In addition, Japanese Unexamined Patent Application Publication No. 2005-217978 proposes a photograph printing device that enables photographing while predicting an image after compositing.

SUMMARY

However, the technology disclosed in Japanese Unexamined Patent Application Publication No. 2011-96134 is not one in which images imaged by a user at different angles of view are composited.

In addition, Japanese Unexamined Patent Application Publication No. 2005-217978 is not of a technology in which a user composites a plurality of images in real time during imaging.

In other words, a technology has not been disclosed in which, when a user arbitrarily performs imaging at various angles of view using an imaging device, a plurality of images are composited in real time during the imaging.

Therefore, it is desirable to enable a user to, for example, create a composite image in real time while performing imaging at various angles of view so as to facilitate the generation of the composite image with high satisfaction. Particularly, in this case, it is desirable to easily obtain a preferred composite image by enabling imaging while checking the state of compositing.

According to an embodiment of the present disclosure, there is provided an image processing device which includes a composite processing unit that generates a composite image for display by including a through image generated based on a captured image signal obtained by performing photoelectric conversion for light incident from a subject in an image for a compositing process and composites a captured image of a recording time point in the image for a compositing process in accordance with a compositing arrangement state of the through image in the composite image for display, and a display control unit that performs display control for the composite image for display.

According to another embodiment of the present disclosure, there is provided an image processing method which includes displaying a composite image for display by generating the composite image for display by including a through image generated based on a captured image signal obtained by performing photoelectric conversion for light incident from a subject in an image for a compositing process, and compositing a captured image of a recording time point in the image for a compositing process in accordance with a compositing arrangement state of the through image in the composite image for display.

According to still another embodiment of the present disclosure, there is provided a program which causes an operation processing device to execute the image processing method.

The technology according to the present disclosure as above presents a composite image for display obtained by including a through image in an image for a compositing process on a monitor display to be presented to a user (photographer) during imaging.

The image for a compositing process is an image in the course of a compositing process, and for example, is an image obtained by compositing an image with a background image or on a part of a background image. In addition, the composite image for display is an image for display to be presented to a user by compositing a current through image on an image for a compositing process.

By compositing a through image on a portion of an image for a compositing process for display as a composite image for display, the user can ascertain what kind of composite image will be obtained through a release operation (a shutter operation for capturing a still image) before a release operation when they view the display.

When a recording time is instructed through the release operation, or the like, by compositing a captured image signal in an image for a compositing process according to a compositing arrangement state of a through image in a composite image for display, a composite image (an image in the course of a compositing process) that a user desires is generated.

According to the present disclosure, there is an effect that a user can ascertain an image obtained by compositing a current through image with, for example, an image captured at a different angle in real time, and thereby being able to easily obtain a preferred composite image of the user.

BRIEF DESCRIPTION OF THE DRAWINGS

FIG. 1 is a block diagram of an imaging device according to an embodiment of the present disclosure;

FIG. 8 is a flowchart of a process by a control unit of the imaging device according to an embodiment of the present disclosure;

FIG. 10 is a flowchart of the process in the album mode according to the embodiment of the present disclosure;

FIG. 17 is a block diagram of an embodiment applied to the information processing device.

DETAILED DESCRIPTION OF EMBODIMENTS

Figure 2A:
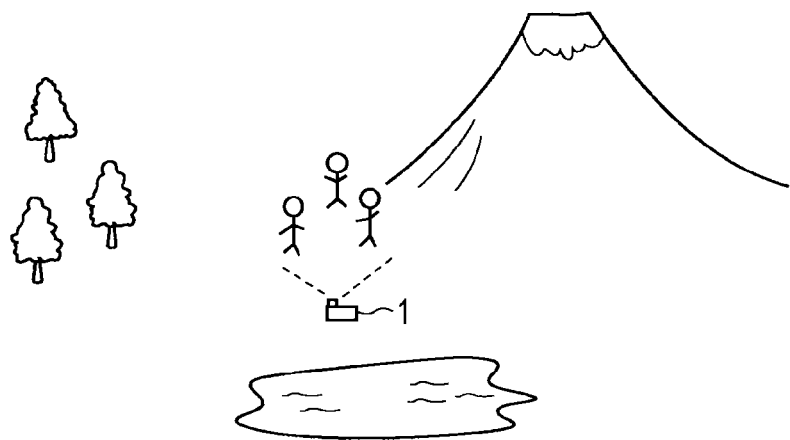
FIGS. 2A to 2C are illustrative diagrams of instruction operation screens of an album mode according to an embodiment of the present disclosure.

Hereinafter, embodiments will be described in the following order. Note that, in the embodiments, an example of an imaging device that includes an image processing device of the present disclosure will be described, but an example in which the image processing device of the present disclosure is realized as an information processing device will also be described later.

<1. Configuration of Imaging Device>
<2. Overview of Album Mode Operation>
<3. Album Mode Process>
<4. Album Edit Mode Process>
<5. Modification Example of Imaging Device>
<6. Application Example in Information Processing Device and Program>

Note that the meanings of terms to be used in the embodiments are as follows.

"Imaging" refers to obtaining a captured image signal (captured image data) by performing photoelectric conversion for a subject light using an image sensor and then performing a predetermined signal process.

Recording data of one captured image which is obtained as a frame image from such "imaging" on a recording medium as a still image is defined to be "recording of still image data." In addition, there is also a case in which recording or transmitting a still image as composite image data is defined to be "recording of composite image data" or "transmitting of composite image data."

A "through image" is generally a subject monitoring image displayed for a user during a stand-by time before a so-called shutter operation (release operation) is performed. In other words, it is a moving image display image of a subject scene generated from each of frames (which may be intermittent frames) obtained from "imaging."

1. Configuration of Imaging Device

A configuration example of an imaging device 1 according to an embodiment is shown in FIG. 1. The imaging device 1 is a so-called digital still camera, and includes an imaging processing device referred in claims therein. In addition, since the image processing device is implemented by a control unit 2 of the imaging device 1 using software, the control unit 2 performs operations as the imaging processing method referred in a claim by executing a process based on a program referred in a claim.

The imaging device 1 includes the control unit 2, a memory unit 3, an operation unit 4, a recording unit 5, a display unit 6, and an imaging unit 10 as shown in FIG. 1.

The display unit 6 is a display unit that performs various kinds of display for a user (photographer), and formed having a display device such as an LCD (Liquid Crystal Display), or an organic EL (Electro-Luminescence) display formed on, for example, the housing of the imaging device 1. Note that a view finder may be formed using an LCD, an organic EL display, or the like.

The display unit 6 includes such a display device as above and a display driver that causes the display device to execute display. The display driver causes the display device to execute various kinds of display based on an instruction of the control unit 2 that controls the whole imaging device 1. The display driver causes, for example, a still image or a moving image captured and recorded on a recording medium to be displayed for reproduction, or a through image (subject monitoring image) as a moving image from captured image data of each frame imaged during a release stand-by to be displayed on the screen of the display device. In addition, the display driver causes various operation menus, icons, messages, and the like to be displayed on a screen as a GUI (Graphical User Interface).

The operation unit 4 functions as an input unit that inputs operations of a user, and transmits signals to the control unit 2 according to the input operations.

The operation unit 4 is realized as various kinds of operation tools provided on the housing of the imaging device 1, a touch panel formed on the display unit 6, and the like.

As the operation tools on the housing, a reproduction menu activation button, a decision button, a cross key, a cancel button, a zoom key, a slide key, a shutter button (release button), and the like are provided.

In addition, various kinds of operations may also set to be possible through a touch panel or by operating a touch panel using icons, menus, and the like displayed on the display unit 6.

The imaging unit 10 performs photoelectric conversion for light incident from a subject, and then obtains a captured image signal (captured image data). To this end, the imaging unit 10 includes a lens section 11, an imaging element 12, an analog signal processing section 13, an A/D conversion section 14, a focus driving section 15, an iris driving section 16, and a zoom driving section 17.

The lens section 11 includes lenses such as a cover lens, a zoom lens, and a focus lens, and a diaphragm mechanism. Light from a subject is collected to the imaging element 12 by the lens section 11.

The imaging element 12 is designed to be an imaging element of types of, for example, a CCD (Charge Coupled Device), a CMOS (Complementary Metal Oxide Semiconductor), or the like.

The analog signal processing section 13 performs an analog signal process such as ISO gain adjustment, or the like for electric signals obtained by the imaging element 12, and then outputs the signals as captured image signals.

The captured image signals are converted to captured image signals as digital data (captured image data) by the A/D conversion section 14, and then supplied to the control unit 2.

The focus driving section 15 drives the focus lens in the lens section 11 based on the control of the control unit 2 so as to execute a focusing operation.

The iris driving section 16 drives the diaphragm mechanism in the lens section 11 based on the control of the control unit 2 so as to execute exposure adjustment.

The zoom driving section 17 drives the zoom lens in the lens section 11 based on the control of the control unit 2 so as to execute a zooming operation.

The memory unit 3 collectively refers to a ROM (Read Only Memory), a RAM (Random Access Memory), a flash memory, and the like.

The RAM (Random Access Memory) of the memory unit 3 temporarily stores data, programs, and the like as work areas during various data processes of the control unit 2. For example, image data processed at the time when the shutter button is pressed is first stored in the RAM of the memory unit 3, and then, written on the recording unit 5.

The ROM and flash memory (non-volatile memory) of the memory unit 3 stores application programs for various kinds of operations in addition to an OS (Operating System) in which the control unit 2 controls each unit, and content files such as image files, and the like. Programs for executing an album mode, and an album edit mode to be described later in the present examples are stored therein.

The recording unit 5 includes, for example, a non-volatile memory, and functions as a storing area in which image files (content files) of still image data, moving image data, and the like, attribute information of the image files, thumbnail images, and the like are stored. With regard to composite images, compositing management information is also recorded thereon in the form of Exif data, or the like.

Such image files are stored in the forms of, for example, JPEG (Joint Photographic Experts Group), TIFF (Tagged Image File Format), GIF (Graphics Interchange Format), and the like.

The real form of the recording unit 5 can be considered in a diversified manner. The recording unit 5 may be, for example, a flash memory built in the imaging device 1, or may be a memory card (for example, a portable flash memory) that can be attached to or detached from the imaging device 1, and card record reproduction unit that performs record reproduction access to the memory card. In addition, the recording unit may be realized as an HDD (Hard Disk Drive), or the like, as a form built in the imaging device 1.

The programs for executing the album mode, and the album edit mode to be described later in the present examples may be stored in the recording unit 5.

The control unit 2 is composed as an operation processing device such as a CPU. The control unit 2 comprehensively controls the entire imaging device 1 by causing programs stored in, for example, the memory unit 3 to be executed.

For example, the control unit 2 controls operations of each necessary units for an encoding process of captured image data supplied from the imaging unit 10, an imaging and recording operation according to the operation by a user, a reproduction operation of recorded image files, camera operations such as zooming, focusing, exposure adjustment, and the like.

Furthermore, in the case of the present embodiments, the control unit 2 executes an image process and a control process of the album mode and the album edit mode to be described later.

To this end, the control unit 2 includes, as software functions blocks, an imaging control section 2a, an image signal processing section 2b, a display control section 2c, a compositing processing section 2d, an output processing section 2e, and an arrangement determination section 2f as shown in the drawing.

The imaging control section 2a functions so that the control unit 2 controls operations necessary for an imaging operation of the imaging device 1.

For example, the imaging control section 2a causes an auto-focusing operation to be executed by controlling the focus driving section 15. In addition, the imaging control section 2a drives the iris driving section 16 so as to perform exposure adjustment according to the detection of an amount of light in the image signal processing section 2b. As exposure adjustment, it is designed to set the shutter speed of the imaging element 12, a gain of the analog signal processing section 13, or the like. In addition, the imaging control section 2a causes a zooming operation to be executed by controlling the zoom driving section 17. In this manner, the imaging control section 2a performs operation control for imaging according to a user's operation or automatic adjustment.

The image signal processing section 2b performs a process of generating image files of still images and moving images by performing a compression process, or encoding (for example, JPEG encoding, or the like) to a recorded format for captured image data supplied from the imaging unit 10. In addition, the image signal processing section 2b also performs a process of generating display data of a through image to be displayed on the display unit 6 based on the captured image data.

The display control section 2c controls a display operation on the display unit 6. For example, the display control section causes a display operation of a through image to be executed, or causes an image reproduced from the recording unit 5 to be displayed. In addition, the display control section controls the execution of display of menus, icons, messages, and the like, for user interfaces.

In the present examples, the display control section 2c controls display of a composite image for display generated in the compositing processing section 2d in the album mode. In addition, in the album edit mode, the display control section causes the display unit 6 to display a user interface image for displaying or editing a composite image, an edited composite image, and the like.

The compositing processing section 2d performs a process for generating composite images.

In the album mode, the compositing processing section generates a composite image for display by causing a through image generated from a captured image signal obtained by performing photoelectric conversion for light incident from a subject in a generated or selected image for compositing process (for example, by inserting a through image in an image for compositing process).

In addition, the compositing processing section 2d performs a process of compositing a captured image signal in accordance with a recording timing into an image for compositing process according to the arrangement state of compositing of a through image into a composite image for display. The captured image signal in accordance with a recording timing mentioned for the imaging device 1 is, for example, a captured image signal taken at a timing of a release operation by a user. Note that the captured image signal at a recording timing is not necessarily limited to a captured image signal taken according to a release. The signal is just a captured image signal that is supposed to undergo a compositing process at a certain timing.

A specific process example will be described later.

The "image for a compositing process" is an image in the course of a compositing process, and for example, is an image obtained by compositing another image into a certain background image or a part of the background image.

In addition, the "composite image for display" is an image for display to be present to a user after compositing a current through image on an image for compositing process.

The output processing section 2e controls an operation of recording and transmitting still images. In the configuration of FIG. 1, the output processing section 2e controls of recording still image data obtained as captured image data of one frame and a composite image generated in the album mode on the recording unit 5 as an image file (recording of still image data and composite image data).

For example, the output processing section outputs an image for compositing process generated at a time point in the compositing processing section 2d to the recording unit 5 as generated composite image data and causes the data to be recorded as an image file. In addition, the output processing section further performs control so that compositing management information including information relating to the background image of the composite image data is recorded on the recording unit 5 in association with the composite image data.

The arrangement determination section 2f determines an arrangement state (arrangement position, and the size) of a through image within an image for a compositing process. In other words, an image obtained by arranging a through image on an image for a compositing process serves as a composite image for display, but the position and size of the through image are determined on the image for a compositing process.

The arrangement state is determined according to the content of a captured image signal of which the image serves as a through image or based on a template. When the arrangement state is determined according to the content of a captured image (content of a through image), for example, when a face image is present, the arrangement position is determined in accordance with the orientation of a face. In a specific process example to be described later, an arrangement is set in accordance with the orientation of a face, but in addition to that, it is considered that, when an image of a pet such as a dog, or a cat is included in a captured image that serves as a through image, for example, the arrangement position of the image is arranged in the lower portion of an image for a compositing process or, in the case of an image of a mountain or clouds, the image is arranged in the upper portion of an image for a compositing process.

In addition, with regard to a size, an example is assumed in which an image of a face, for example, is set to have a relatively large size.

Furthermore, determination of a background image and transposition of an image on the background image is also performed according to depth information. For example, it is an arrangement setting process such as setting a captured image of a distant view to be a background. For example, it is a process in which it is determined whether or not the depth of a background image is deeper than the depth of a through image, and when the depth of the through image is deeper, the through image is determined to be a background image.

In addition, the arrangement determination section 2f further determines an arrangement state of a through image and an arranged image within an image for a compositing process in accordance with the arranged image which has already been arranged in the image for a compositing process. If a certain image has already been arranged in the upper left side of an image for a compositing process, for example, a through image is arranged in the upper right side thereof. In addition, sequentially adapting arrangement positions in accordance with a template to be described later is also an example of the process of determining an arrangement state of a through image in accordance with an arranged image.

According to an arrangement state determined by the arrangement determination section 2f in this manner, the composite processing section 2d performs compositing arrangement of a through image on an image for a compositing process, and thereby generating a composite image for display.

With this configuration, an image processing device referred in the claims is constituted at least by the display control section 2c and the compositing processing section 2d, which is formed in the operation processing device as the control unit 2. In addition, the image processing device referred in the claims may also be constituted by adding the arrangement determination section 2f and the output processing section 2e thereto.

As a process relating to the album mode to be described later, the following control process is executed by the image processing device.

Instruction Detection of Album Mode On

An instruction of album mode on is detected based on user operation information from the operation unit 4.

Change of an Image Size

Evaluation values (evaluated based on smile detection+ambient sound+motion detection+the golden ratio of 1:1.6) are put on an image captured in the album mode and the original image, a thumbnail image, and the like are re-sized in order of the evaluation values.

Automatic Choice of a Similar Image

When the similarity between a through image generated from captured image data obtained by the imaging unit 10 in the album mode and an image captured in the album mode is high, a process is performed in which one image of them is chosen and the other image is rejected.

Selection of a Background Image During Compositing

A focal length and the depth of field of a captured image are detected by the focus driving section 15 and the iris driving section 16 and set to be the depth of an image. When the focal length and the depth of field are the same parameter, the depth is determined based on zoom data of the zoom driving section 17. The zoom data is retained in an Exif Maker Note. Then, control is performed so as to select, for example, an image having the deepest depth out of a through image in the album mode and an image captured in the album mode to be the background image during compositing. Selection of an image position during compositing Control is performed so that the orientation of a person's face in a captured image is detected in an image process, and the orientation of the face is arranged so as to face the center of a composite image for an image out of a through image in the album mode and an image captured in the album mode from which the orientation of the face is detected.

Synthesis of an Image

A composite image for display is generated by compositing a through image in the album mode and an image captured in the album mode and displayed on the display unit 6.

In addition, a captured image according to a release timing is composited on an image for a compositing process in the album mode, and updating of the image for a compositing process continues.

Display of a Compositing Position of a Through Image

Emphasis display is performed using a technique such as highlight display, or the like, so that a composited area of a through image after compositing can be easily found when a composited image obtained by compositing the through image is displayed as a composite image for display.

Detection of Change Instruction on a Composite Image and Composite Image Editing In the album edit mode, a change instruction on the position, size, background image, and similar image to be rejected of each image in a composite image from the operation unit 4 is detected, and the composite image is changed according thereto.

Generation and Recording of Compositing Management Information

As compositing management information of a composite image (which is a sphere in which, for example, user comments, maker notes of Exif can be freely described. For more details, please refer to "Image File Format Standard for digital still cameras Exif version 2.3 (CIPA DC-008-2010)" prescribed by Camera & Imaging Product Association (CIPA) and Japan Electronics and Information Technology Industries Association (JEITA)), information including "a used captured image," "a background image," "the depth of a background image," "the number of persons and the orientation of a face in each used captured image," "a used template," and the like is generated, and then recorded on the recording unit 5 in association with the composite image.

Additional Compositing to a Composite Image of the Past

Referring to the above-described compositing management information, additional compositing is performed in the album mode using a composite image that was composited and recorded on the recording unit 5 in the past. In other words, using a composite image of the past as an image for a compositing process, the generation of a composite image for display which is composited with a through image and the compositing of a captured image of a release time are performed.

2. Overview of Album Mode Operation

In the imaging device 1 of the present embodiment, an album mode (composite imaging mode) for generating a composite image is prepared.

In the album mode, a composite image can be generated by performing imaging while a user checks the compositing state in real time.

Prior to detailed description of a process in the album mode, first, an album mode operation is described using FIGS. 2A to 7C.

FIG. 2A shows a state in which a photographer performs imaging using the imaging device 1. There are "persons," "a mountain," "a forest," and "a pond" that serve as subjects around a user (photographer).

The imaging device 1 has an imaging mode and a reproduction mode like general digital still cameras, and the user can perform imaging in the imaging mode and reproduction display of images imaged and recorded in the reproduction mode.

Figure 2B:
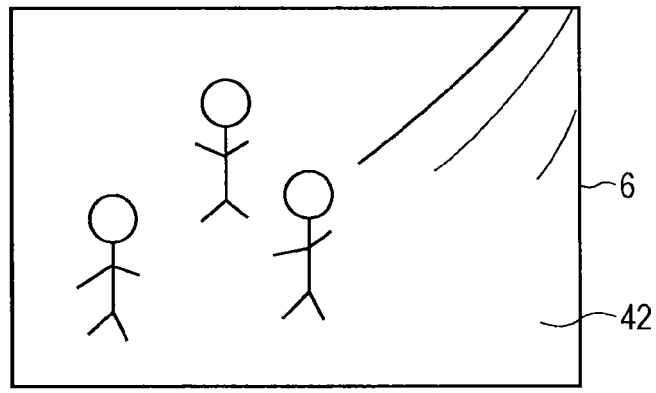

FIG. 2B shows a state in which a through image is displayed on the display unit 6 in the imaging mode. In the state (before a release operation) in which the user of the imaging device 1 searches for a subject (angle of view), the through image 42 is displayed on the display unit 6.

Figure 2C:
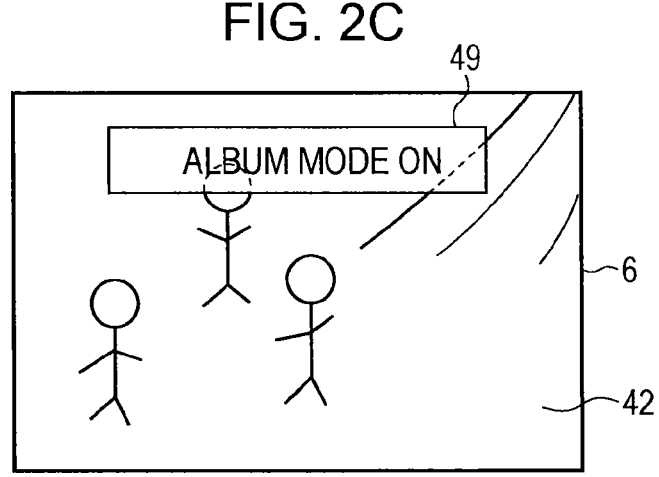

In the present example, it is possible to perform album mode imaging particularly by switching a mode from the general imaging mode to the album mode. As shown in FIG. 2C, for example, an album mode on button 49 is displayed on the display unit 6 as a touch panel operation button. When the user operates the album mode on button 49, the imaging device 1 starts to be operated in the album mode. Of course, the operation of instructing the album mode may be performed with an operation key on the housing of the imaging device 1, or with a touch operation in the form of a menu. The same is applied to an operation of finishing the album mode.

Figure 3A:
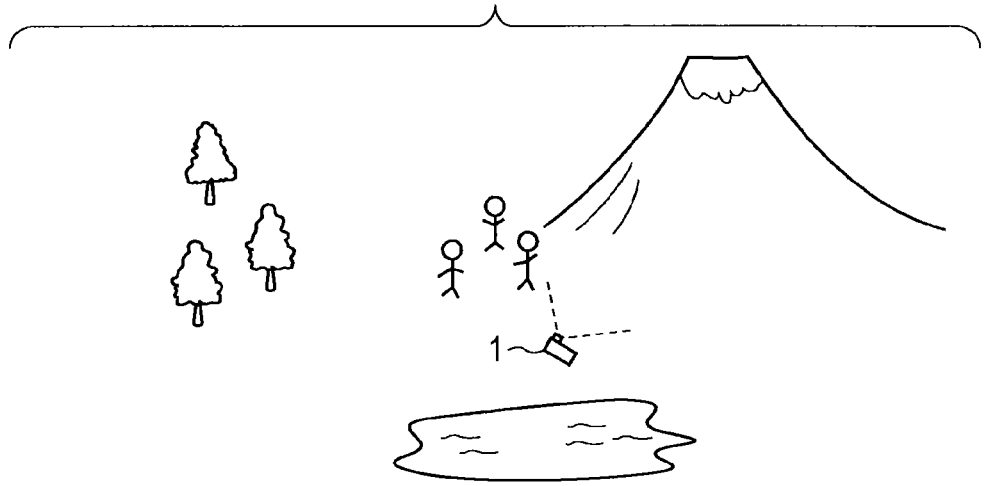
FIGS. 3A to 3C are illustrative diagrams of an album mode operation according to an embodiment of the present disclosure.
Figure 3B:
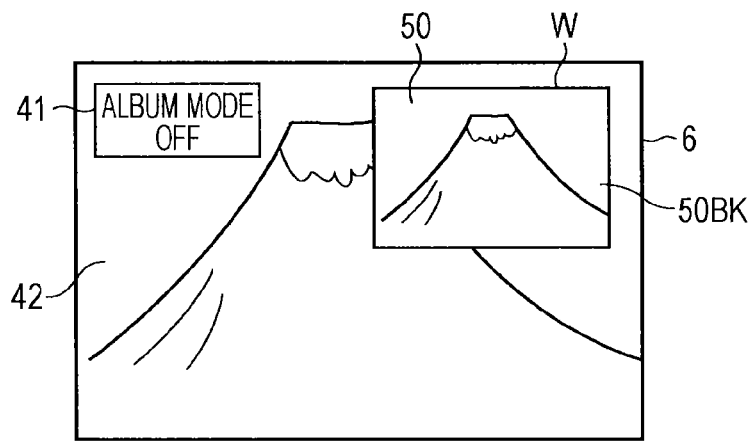

When the mode is switched to the album mode, a partial region of the through image 42 is set to be a composite image frame for display W, and a composite image for display 50 is displayed on the display unit 6 as shown in FIG. 3B. As previously described, the composite image for display 50 is an image for display to be presented to the user by compositing the current through image on an "image for a compositing process" which is in the course of a compositing process.

First, when the user takes a picture of the "mountain" as the subject using the imaging device 1 as shown in FIG. 3A, the "mountain" is displayed as the through image 42.

Though being described in a process example later, in the first place of the album mode, the image for a compositing process is not present, or a composite image or a still image that was imaged and recorded in the past is selected and used as the image for a compositing process.

Figure 3C:
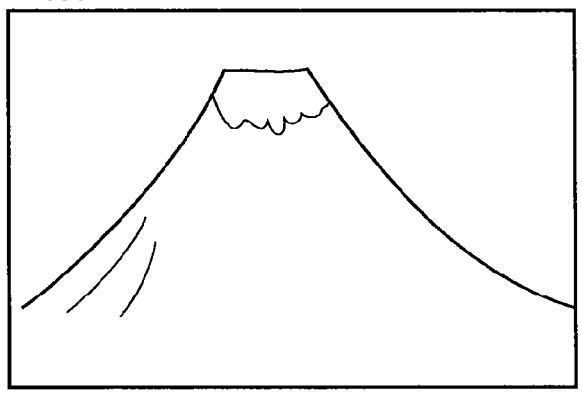

FIGS. 3A to 3C show an example in which the image for a compositing process is not present in the first place in order to generate a new composite image. In this case, it is assumed that the background image is first decided as the image for a compositing process.

In the album mode, the control unit 2 stores the image for a compositing process (image data in the course of a compositing process) therein, and the composite image for display 50 is generated and displayed on the display unit 6 based on the image for a compositing process.

Basically, the image for a compositing process is an image including the background image by setting image data of the through image as the background image in the first place.

The composite image for display 50 corresponding to the image for a compositing process is generated, and the composite image frame for display W is displayed as shown in FIG. 3B. Thus, at this time point, the composite image for display 50 is an image only of a through image with the background 50BK.

As another touch panel operation button, an album mode off button 41 for terminating the album mode is also displayed on the display unit 6. When the user desires to terminate the album mode, they may operate the album mode off button 41.

It is assumed that, for example, the user performs a release operation by selecting the "mountain" as a subject.

Then, a process of recording still image data of one frame image is performed according to the release operation, and an image file Pic001 of FIG. 3C is recorded on the recording unit 5. At the same time, a low-resolution image as a thumbnail image and screen nail image is recorded. The thumbnail image is a low-resolution image, and the screen nail image is an image with an intermediate level of resolution which is higher than that of the thumbnail.

With regard to a compositing process, at the time when the image file Pic001 is recorded, the image is set as the background image of an image for a compositing process. In addition, information of the background image as compositing management information relating to a composite image to be created this time (which is the image for a compositing process at this time point) is also generated and recorded. The information of the background image may be background image data, or information indicating that the image file Pic001 is set to be the background image. In addition, information of the depth of the background image is also included.

Figure 4A:
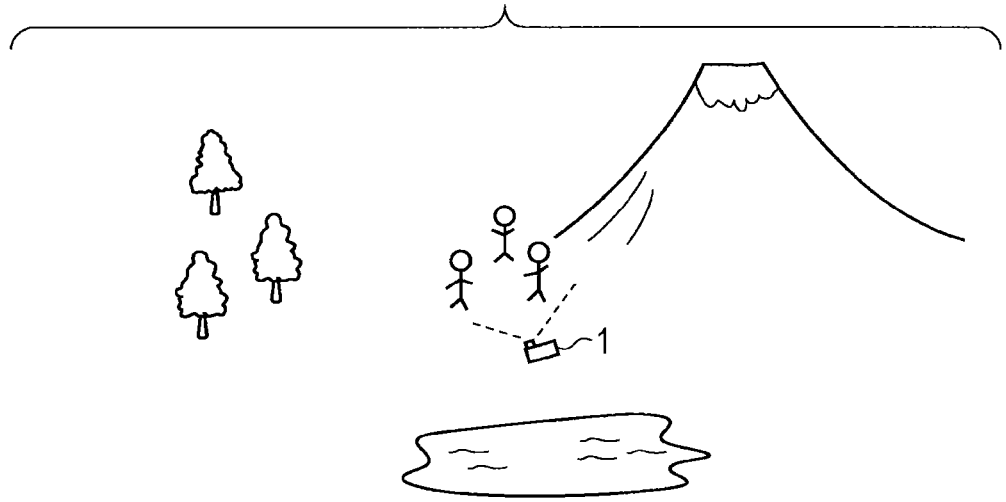
FIGS. 4A to 4C are illustrative diagrams of another album mode operation according to an embodiment of the present disclosure.
Figure 4B:
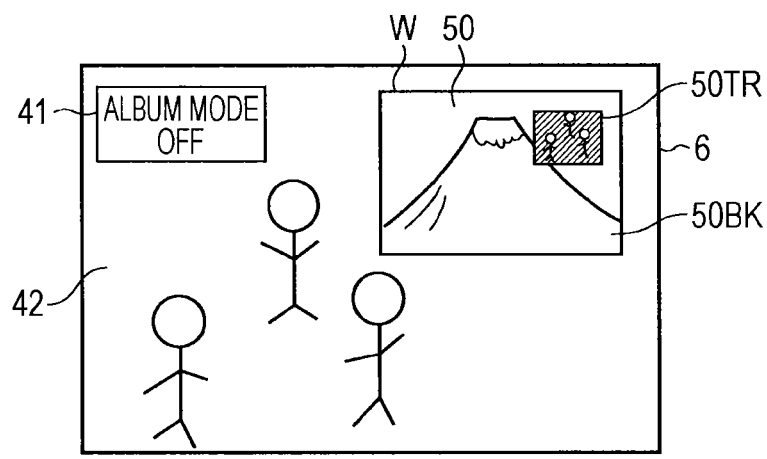

Next, the user directs the imaging device 1 toward the "persons" as shown in FIG. 4A. The through image 42 displayed on the display unit 6 is the image of the "persons" as shown in FIG. 4B. In this case, the composite image for display 50 displayed in the composite image frame for display W is an image in which a through image 50TR is composited with a background image 50BK. Since the through image 42 is a moving image due to the fact that the image sequentially displays frame images captured at each time point. The through image 50TR displayed by being composited on the composite image for display 50 is also a moving image.

In addition, in the composite image for display 50, the current area of the through image 50TR is displayed in highlight so that the user can clearly recognize (In the drawing, slant lines indicates being highlighted).

Highlight display is considered as an example of emphasis display, but on top of that, various techniques of emphasis display are considered including, for example, expressing the frame portion of the area of the through image 50TR by a thick line or accent color, changing the hue of the through image 50TR, displaying in a flickering manner, lowering the luminance of the portion other than the through image 50TR, or the like.

With the composite image for display 50 of FIG. 4B, the user can ascertain what kind of a composite image will be generated from the release operation.

Herein, it is assumed that the user performs a release operation in the state of FIG. 4B.

Figure 4C:
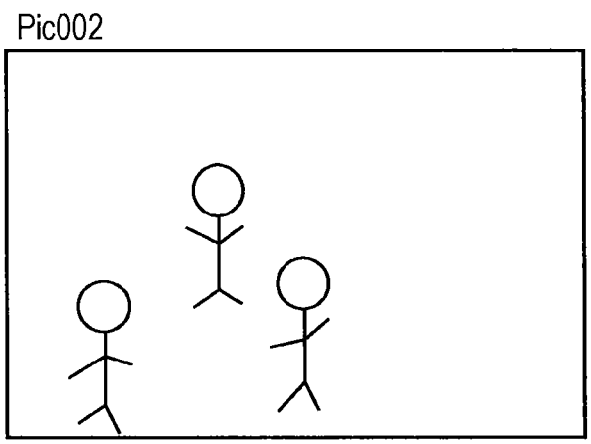

Then, a process of recording still image data of one frame image is performed according to the release operation, and an image file Pic002 of FIG. 4C is recorded on the recording unit 5. At the same time, a low-resolution image is recorded as a thumbnail image and a screen nail image.

With regard to a compositing process, with the recording of the image file Pic002, an image obtained by taking the "persons", that is, one frame of captured image data at the release time point is composited in the image for a compositing process.

At this moment, the captured image data is composited in the image for a compositing process according to the state of compositing arrangement of the through image 50TR in the composite image for display 50 (the state of compositing arrangement in terms of the position and the size thereof on the background image 50BK) at the release time point. In other words, the image for a compositing process is updated to an image like the composite image for display 50 of FIG. 4B.

Figure 5A:
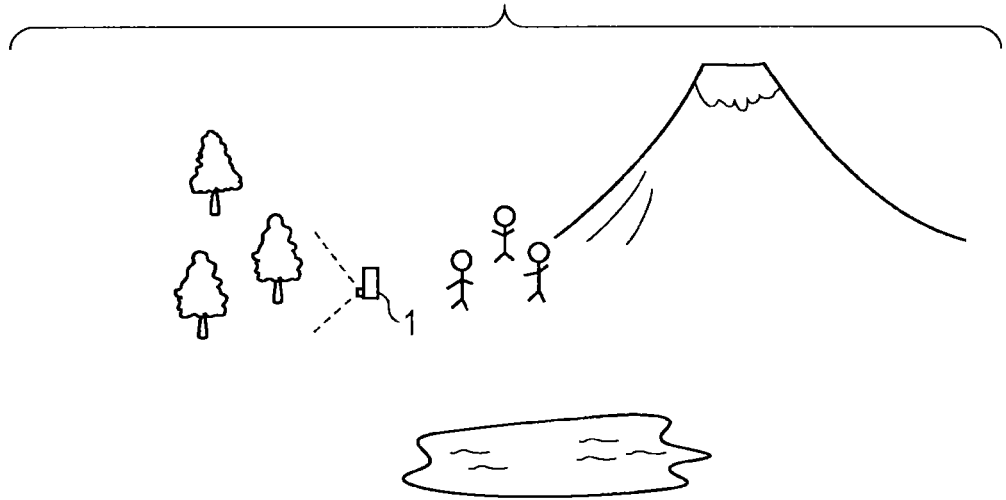
FIGS. 5A to 5C are illustrative diagrams of another album mode operation according to an embodiment of the present disclosure.

Next, the user directs the imaging device 1 toward the "forest" as shown in FIG. 5A. The through image 42 displayed on the display unit 6 is an image of the forest as shown in FIG. 5B.

At this moment, the image for a compositing process is an image obtained by compositing the background of the image of the "mountain" with the image of the "persons" at the previous release operation time point of FIG. 4B. Accordingly, in the case of FIG. 5B, the composite image for display 50 displayed in the composite image frame for display W includes the display of the background image 50BK and a composited image 50A that has been imaged and captured before, and the through image 50TR that is currently imaged. The through image 50TR is displayed in highlight.

With the composite image for display 50 of FIG. 50B, the user can ascertain what kind of a composite image will be generated from the release operation.

Figure 5B:
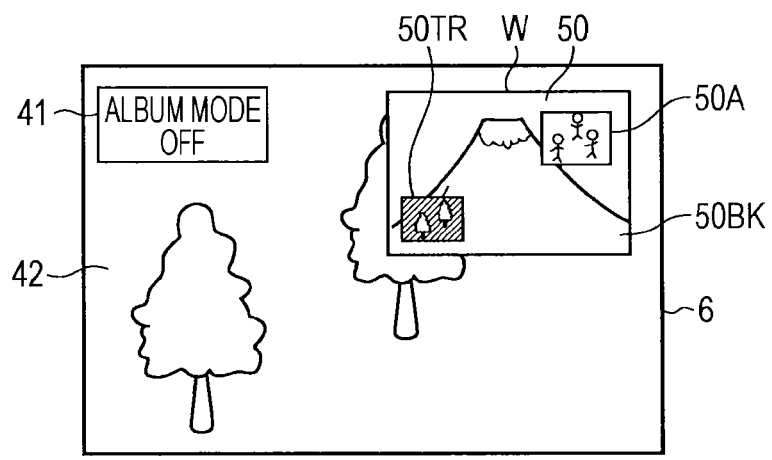

It is assumed that the user performs another release operation in the state of FIG. 5B.

Figure 5C:
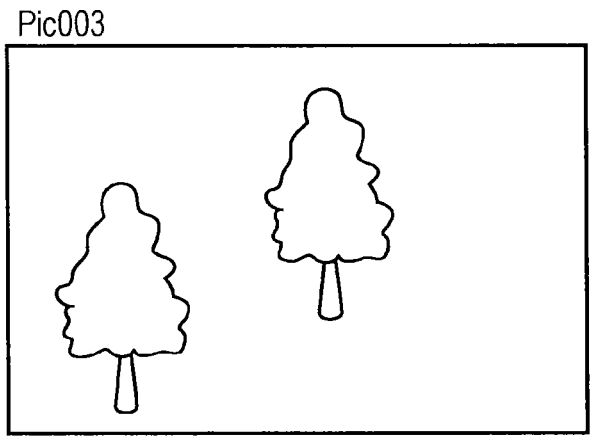

Then, a process of recording still image data of one frame image is performed according to the release operation, and an image file Pic003 of FIG. 5C is recorded on the recording unit 5. At the same time, a low-resolution image is recorded as a thumbnail image and a screen nail image.

With regard to a compositing process, with the recording of the image file Pic003, an image obtained by taking the "forest", that is, one frame of captured image data at the release time point is composited in the image for a compositing process.

Figure 6A:
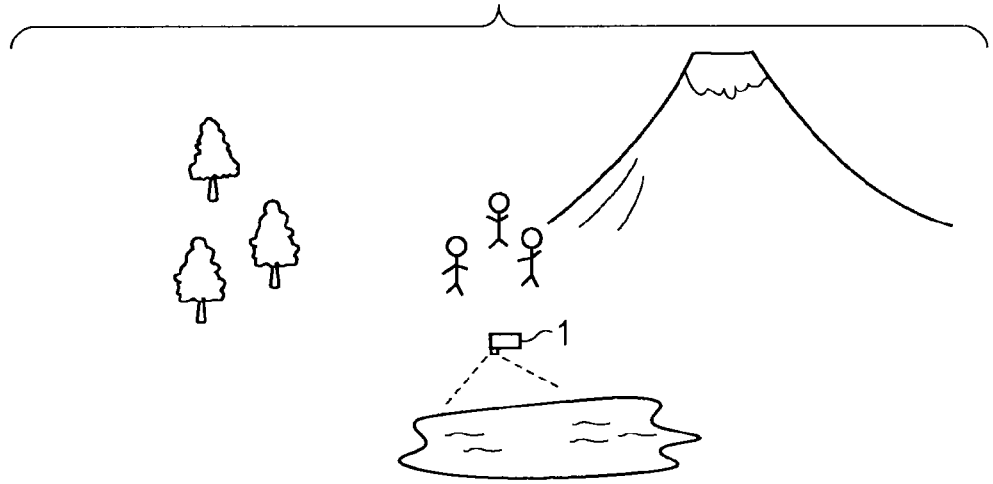
FIGS. 6A to 6C are illustrative diagrams of another album mode operation according to an embodiment of the present disclosure.

Next, the user directs the imaging device 1 toward the "pond" as shown in FIG. 6A. The through image 42 displayed on the display unit 6 is the image of the "pond" as shown in FIG. 6B.

At this moment, the image for a compositing process is an image in which the image of the "persons" at the time of the previous release operation of FIG. 4B and the image of the "forest" at the time of the release operation of FIG. 5B, are composited on the background of the image of the "mountain". Accordingly, in the case of FIG. 6B, the composite image for display 50 displayed in the composite image frame for display W includes the display of the background image 50BK and composited images 50A and 50B that have been imaged and composited at the previous time points, and the through image 50TR that is currently imaged. The through image 50TR is displayed in highlight.

Figure 6B:
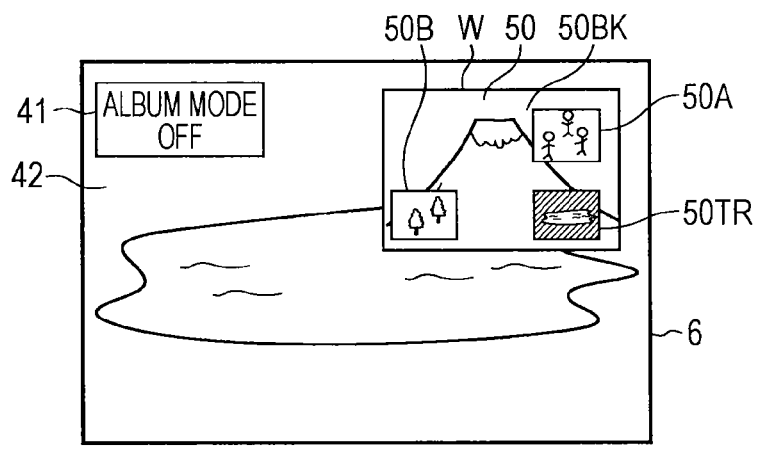

It is assumed that the user performs another release operation in the state of FIG. 6B.

Figure 6C:
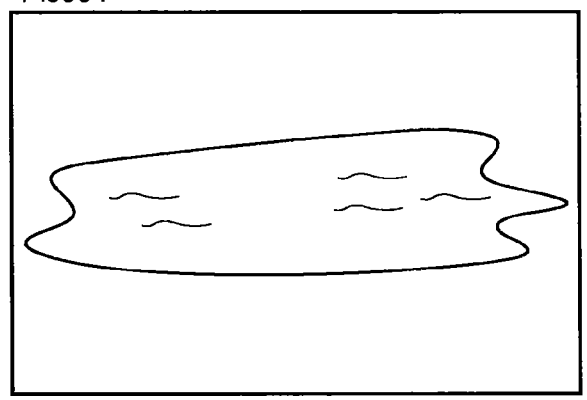

Then, a process of recording still image data of one frame image is performed according to the release operation, and an image file Pic004 of FIG. 6C is recorded on the recording unit 5. At the same time, a low-resolution image is recorded as a thumbnail image and a screen nail image.

With regard to a compositing process, with the recording of the image file Pic004, an image obtained by taking the "pond", that is, one frame of captured image data at the release time point is composited in the image for a compositing process.

Figure 7A:
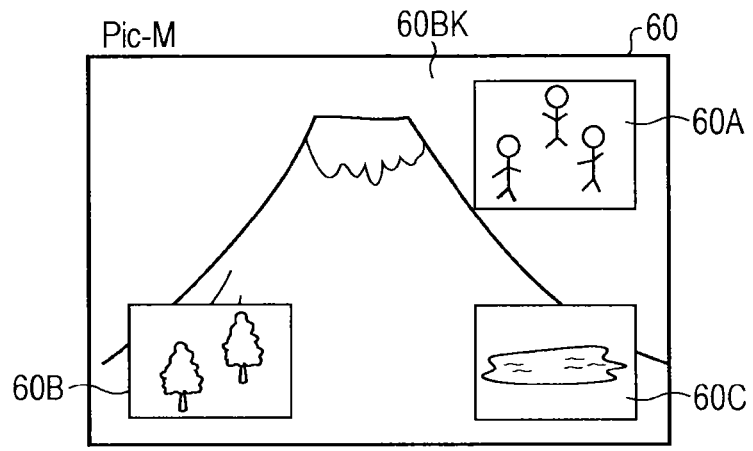
FIGS. 7A to 7C are illustrative diagrams of a change in image content in an album edit mode according to an embodiment of the present disclosure.

At this moment, for example, the image for a compositing process stored in the control unit 2, that is, the content of the background image described above and an image in which other images are composited on some portions of the background image and which is under a compositing process is formed as an image for a compositing process 60 shown in FIG. 7A.

In this case, the image of the image file Pic001 that is first imaged and recorded serves as a background image 60BK. In addition, image files Pic002, Pic003, and Pic004 that are imaged and recorded thereafter are composited on the background image 60BK as images 60A, 60B, and 60C, respectively.

The control unit 2 outputs the image for a compositing process 60 as one piece of composite image data at a certain time point. For example, the control unit performs a process of recording composited image data and causes the data to be recorded on the recording unit 5 as a composite image file Pic-M.

As described above, the user continues imaging while checking the through images composited with the images captured up to that time using the composite image for display 50, and as a result, can obtain the composite image (Pic-M) as shown in FIG. 7A.

In the composite image for display 50, the arrangement position and scope for the compositing of the through image 50TR are automatically set by the control unit 2 based on a template, or the like.

In addition, in the image for a compositing process 60, the position and scope for the compositing of the captured image data at the release operations are those of the through image 50TR set in the composite image for display 50.

For example, the user can designate a preferred compositing arrangement state to some degree by selecting a template beforehand, or the like.

However, it is possible to arbitrarily change the state of the compositing position as shown in, for example, FIGS. 7B and 7C with an operation of an album edit mode to be described later.

3. Album Mode Process

A process of the control unit 2 for realizing an album mode process as above will be described. The control unit 2 executes the processes of FIGS. 8, 9, and 10 to be described below using the functional blocks (2a to 2e) shown in FIG. 1.

First, FIG. 8 shows a process relating particularly to the album mode as a process performed after power is turned on for the imaging device 1. A process relating to the operation of other general digital still cameras will not be described.

After power is turned on in Step F101, the control unit 2 enters an imaging mode in Step F102.

In Step F103, the control unit 2 checks a polling process of the album mode. When the user performs an instruction operation of the album mode, the polling process of the album mode is detected in Step F103, and the control unit 2 proceeds to Step F104 and the following steps. That is, for example, the case in which the user operates the album mode on button 49 of FIG. 2C.

In Step F113, the control unit 2 monitors the polling process of the album edit mode. When the user performs an instruction operation of the album edit mode without giving an instruction of the album mode, the processes of Steps F113 to F120 are performed based on the fact that the polling process of the album edit mode has occurred. This will be described later.

When the album mode is instructed, the control unit 2 performs a template selection process in Step F104. A template is a composite image in which the arrangement position and scope in compositing of an image on a background image are set. The number of template may be only one, but it may be possible that various kinds of templates are prepared in advance so that the user can select one of them. For example, templates for travel, wedding, sports day, and the like may be set.

Settings are considered in which, for example, in a template for wedding, an image with a white dress is arranged at the center thereof, in a template for travel, images are arranged in a time series manner, and the like.

The control unit 2 may cause the display unit 6 to display the list of various templates thereon in Step F104 and then perform a process of causing the user to select one.

After a template is selected as one to be used in Step F104, the process proceeds to Step F105.

The control unit 2 determines whether or not a new composite image is to be created in Step F105. In this case, the control unit 2 displays for causing the user to select the creation of a new composite image or the use of a recorded image on the display unit 6, and then determines whether or not a new composite image is to be created according to an operation input.

When the user selects the creation of a new composite image, the process is shifted to the composite process of Step F109 with the album mode on in Step F106 without change.

On the other hand, when the user selects the use of a recorded image of the past not the creation of a new composite image, the control unit 2 proceeds to Step F107. The recorded image of the past is, for example, still image data recorded on the recording unit 5 or composite image data of the past.

When certain still image data (image file Pic00x) is used, a compositing process can be performed using the still image data as a background image.

When certain composite image data created in the past is used, an image that is newly captured in this time can be composited on the composite image data (a background image and a composited image).

Then, the control unit 2 causes the user to select image data to be used in Step F107. In this case, the control unit 2 causes the display unit 6 to display a list of image data recorded on the recording unit 5, and the user to select one.

After the user performs a selection operation, the control unit 2 performs reading of the selected image (still image data or composite image data) in Step F108. In the case of the composite image data, compositing management information is also read.

Then, with the album mode on in Step F106, the process is shifted to a composite process of Step F109.

Figure 9:
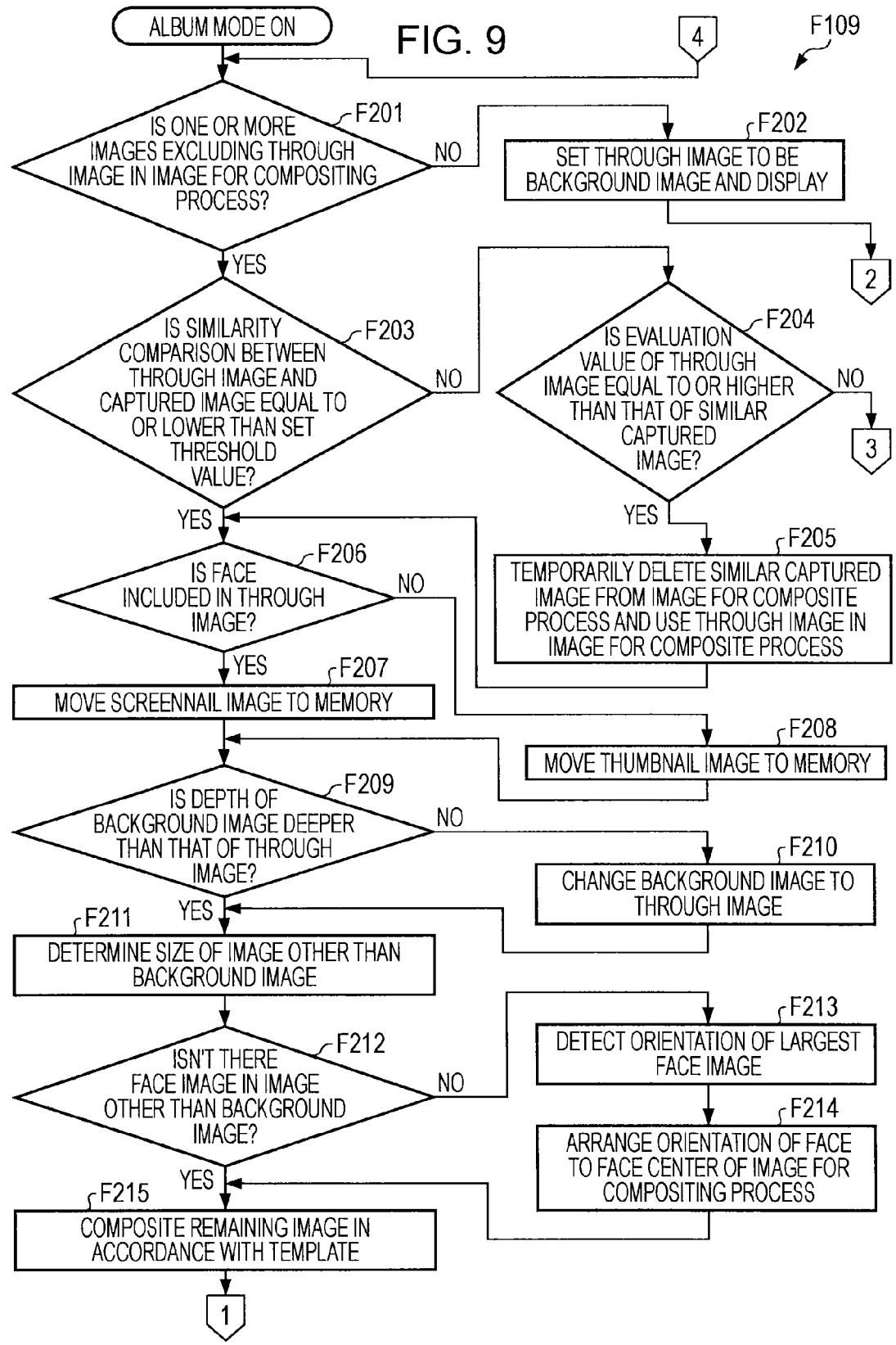
FIG. 9 is a flowchart of a process in the album mode according to an embodiment of the present disclosure.

The composite process of Step F109 after the album mode on is described in detail in FIGS. 9 and 10.

First, the control unit 2 determines whether or not there are one or more images except for the through image in the image for a compositing process 60 in Step F201 of FIG. 9.

In the case in which a new composite image is to be created, the image for a compositing process 60 has not been present yet. As described in FIG. 3B, there is only captured image data that serves as a through image at the time point. In this case, the process proceeds from Step F201 to F202, and the captured image data that serves as a through image is set to be the background image 60BK.

Then, for the composite image for display 50, the control unit 2 displays an image in which the background image 50BK as shown in FIG. 3B is set to be a through image. In other words, the control unit 2 sets a portion of the through image 42 to be the composite image frame for display W, and causes the composite image for display 50 only of the through image to be displayed.

Figure 7B:
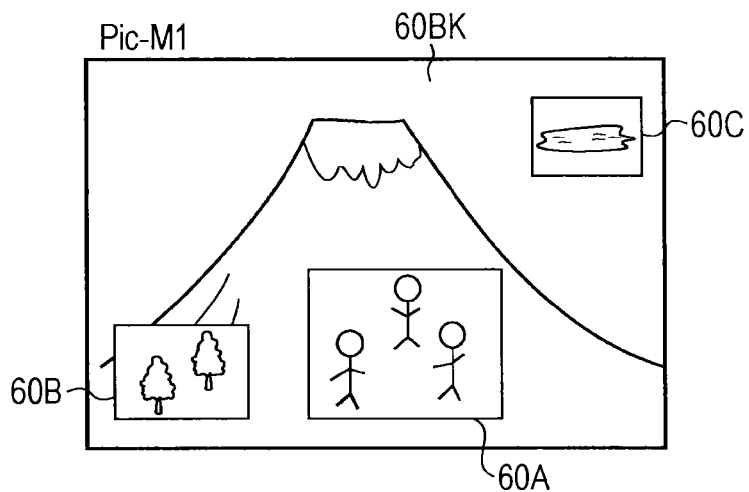
Figure 7C:
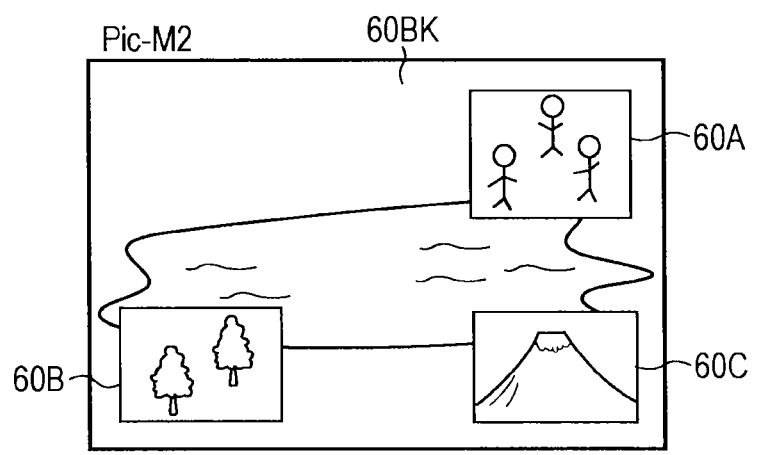

(For the sake of description, reference numeral "60BK" is given to the background image in the image for a compositing process 60 as shown in FIGS. 7A to 7C and reference numeral "50BK" is given to the "background image" in the composite image for display as shown in FIGS. 3B, 4B, 5B, and 6B.)

In this case, the process proceeds to Step F219 of FIG. 10, and the state (for example, the state of FIG. 3B) continues until a polling process of a release instruction is detected in Step F219 or an instruction of album mode off is detected in Step F226.

When the user performs a release operation at a time point and the control unit 2 detects that there is a polling process of a release request in Step F219, the control unit 2 causes the process to proceed from F219 to Step F220 to perform a release process. In other words, one frame of captured image data corresponding to the time point of the release operation is taken as a sill image, and a signal process (compression encoding, or the like) necessary for recording is performed.

Then, the still image data is recorded in Step F221. In other words, the one frame of still image data is recorded on the recording unit 5 as an image file Pic00x.

Further, in Step F222, the image for a composite process is saved in the memory unit 3. Until then, it is in the state in which the background image 60BK of the image for a compositing process 60 is set to be a through image and there is no confirmed image for a compositing process 60. Thus, in this case, the image for a compositing process 60 having image data relating to the release process of this time as the background image 60BK is saved in the memory unit 3.

In addition, the control unit 2 causes the memory unit 3 to store information of the background image 60BK by having depth information thereof as a part of the compositing management information in Step F223. The information of the background image 60BK may be image data of the background image 60BK itself, or information of designating the image file Pic00x set as the background image. In addition, for the depth information, a value of the focal length of a value of depth of field during the imaging operation, or a zoom value may be used as described above.

When there is no instruction of a composite image to be monitored in Step F224 and instruction of album mode off to be monitored in Step F226, the process returns to Step F201.

In the case of the creation of a new composite image, after Steps F220 to F223 are executed according to the release operation for the first time as above, the background image 60BK is set as the image for a compositing process 60, and thus, the composite image for display 50 becomes as shown in FIG. 4B. In other words, the composite image for display forms an image in which the background image 50BK and the through image 50TR are composited.

In addition, when the use of still image data of the past is selected and the album mode is started, the still image data read in Step F108 of FIG. 8 becomes the first image for a compositing process 60. In this case, the image of FIG. 4B is displayed at the time when the display of the composite image for display 50 is started. In other words, the image is one in which the background image 50BK and the current through image 50TR are composited.

In addition, when a composite image created in the past is selected and the album mode is started, the composite image data read in Step F108 of FIG. 8 becomes the first image for a compositing process 60. In this case, the composite image for display 50 is an image as shown in FIG. 5B or 6B at the time when the display of the composite image for display 50 is started. In other words, the image is one in which the background image 50BK, the composited image 50A and the current through image 50TR are composited.

In this case, in other words, in the state in which at least the background image 60BK is set in the image for a compositing process 60, the control unit determines that there are one or more images except for the through image in the image for a compositing process 60 in Step F201.

Then, the control unit 2 proceeds to Step F203, and then compares the similarity between the current through image and each image that is present in the image for a compositing process 60 and was captured in the past.

In the case of FIG. 4B, for example, the through image 42 (50TR) and the background image 60BK in the image for a compositing process 60 which corresponds to the background image 50BK are compared for the similarity.

In the case of FIG. 5B, the through image 42 (50TR) and the background image 60BK in the image for a compositing process 60 which corresponds to the background image 50BK are compared for the similarity, and the through image 42 (50TR) and the image 60A in the image for a compositing process 60 which corresponds to the composited image 50A are compared for the similarity.

Then, if a value computed as the similarity is equal to or lower than a set threshold value, it is determined that the images are not similar, and the process proceeds to Step F206.

If the value computed as the similarity exceeds the set threshold value, the process proceeds to Step F204 based on the determination that the current through image 42 is similar to an image in the image for a compositing process 60. This applies to a case in which the user sets the imaging device 1 to be the same angle of view as that during imaging of the past. For example, when the user directs the imaging device 1 toward the "mountain" for a subject after the composite image for display 50 of FIG. 4B is displayed, the through image is the image of the "mountain". Then, it is determined that the background image BK (the image of the "mountain") in the image for a composite process 60 is similar to the current through image (the image of the "mountain").

In this case, the control unit 2 computes an evaluation value of each image in Step F204. Then, it is determined whether or not the evaluation value of the current through image is equal to or higher than the evaluation value of a similar captured image of the past.

Various techniques of computing evaluation values are considered, but when a face image is present, for example, points are given according to detection of a smile, or to evaluation of composition thereof, evaluation of a focus state or contrast state, and the like are considered.

If the evaluation value of the current through image is equal to or higher than the evaluation value of a captured image of the past, the control unit 2 proceeds to Step F205, and performs transposition of images on the image for a compositing process 60. In other words, the captured image of the past that is similar to the through image is deleted from the image for a compositing process 60 and image data of one frame of the current through image is inserted therein.

After performing the processes of Steps F203, F204, and F205, when the user subsequently sets a similar and favorable image as a subject, even though it is an image that has already been captured and incorporated in the image for compositing process 60, a process of switching the through image at that moment is automatically performed. Accordingly, even without the user's particular release operation, an image that is evaluated as the best of the user's desired angle of view images is incorporated into the image for compositing process 60 (a subsequent composite image).

On the other hand, if the evaluation value of the current through image is low, the switching is not performed, and the process proceeds to Step F204→F224 (monitoring of an indication of changing the composite image)→F226 (monitoring of an instruction of the album mode off)→F201. In this case, monitoring of a release request of Step F219 may be added thereto by proceeding Step F204→F219→F224→F226→F201.

Next, in Step F206, the control unit 2 determines whether or not a face image is included in the current through image.

If a face image is not included, the control unit 2 moves the thumbnail image (a low-resolution image) of the through image to the memory unit 3 as data to be used in a generation process of the composite image for display 50 in Step F208.

On the other hand, if a face image is included in the through image, the control unit 2 moves the screen nail image (image with intermediate resolution) of the through image to the memory unit 3 as data to be used in the generation process of the composite image for display 50 in Step F207.

The reason for using the thumbnail image and the screen nail image is to reduce a load imposed on the generation process of the composite image for display 50. In addition, the reason for using the screen nail image when a face image is included is that it is difficult to evaluate of the face image in most cases in which resolution is too low.

The control unit 2 determines whether or not the depth of the background image 60BK is deeper than the depth of the through image in Step F209. The control unit 2 detects the focal length and the depth of field of a captured image using the focus driving section 15 and the iris driving section 16 and sets the values to be the depth of the image. When the focal length and the depth of field are the same parameter, the depth is determined based on zoom data of the zoom driving section 17.

In addition, in the case of creating a new composite image, the depth information (focal length, the depth of field, the zoom value, and the like) previously set in Step F223 is compared to the depth information of the current through image. In the case of using the captured image of the past, the depth information of the background image in the compositing management information read in Step F108 of FIG. 8 is compared to the depth information of the current through image.

If the depth of the current through image is deeper, the process proceeds to Step F210, and the background image 60BK is changed to be the current through image.

Accordingly, the control unit 2 performs automatic control so that any image having deepest depth out of the through image and an image captured in the album mode is selected as the background image for compositing in the album mode.

The process of Step F210 may be applied only to the case of creating a new composite image. In other words, in the case of using the captured image of the past, it is also considered that Step F210 is not executed (the background image 60BK is not changed).

In Step F211, the control unit 2 determines the sizes of the images other than that of the background images BK.

The control unit 2 determines the size of the images based on a comprehensive value obtained from "evaluation of a feature amount of smile detection, the volume level during imaging, a motion vector, and the golden ratio of 1:1.6" of each image and the like.

In addition, control unit 2 performs re-sizing for the original image of each image or the thumbnail images based on the comprehensive value so that the total size of the entire image obtained by excluding the background image 60BK from the full-sized image has a fixed ratio (for example, 70% of the full size).

In Step F212, the control unit 2 performs face detection for the image in which the background image 60BK is excluded (the image 60A, the through image, or the like), and extracts an image with the face.

When there is an image including a face image, the control unit 2 detects the orientation of a face image having the largest size in the extracted image in Step F213.

Then, in Step F214, the control unit 2 performs positioning so that the orientation of the face faces the center of the composite image.

Figure 11A:
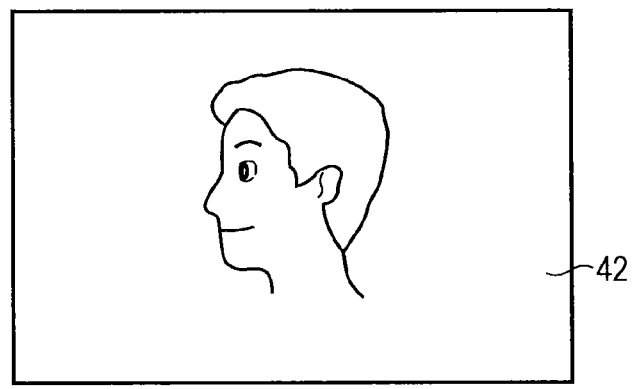
FIGS. 11A to 11C are illustrative diagrams of arrangement of an image including a face according to an embodiment of the present disclosure.

For example, FIG. 11A shows a case in which a face image is included in the through image 42. If the image is incorporated to the composite image, for example, the composition in which the face is set to face the center line CT of the image as shown in FIG. 11B is preferable.

Thus, when the face faces the left side as in this example, the face is arranged on the right side of the center line of the image.

Figure 11B:
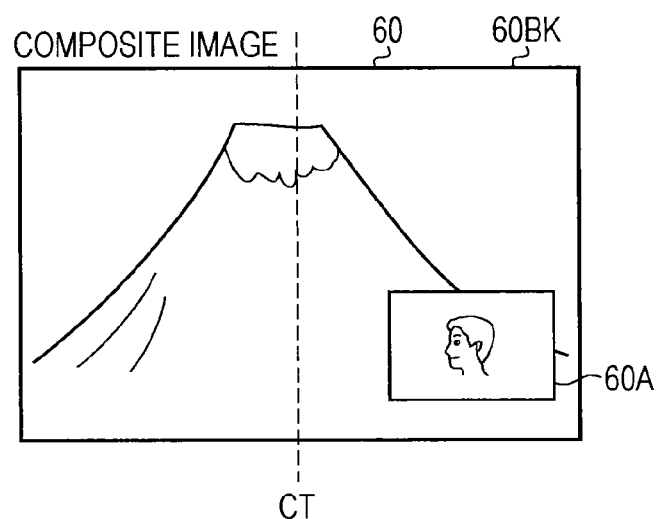
Figure 11C:
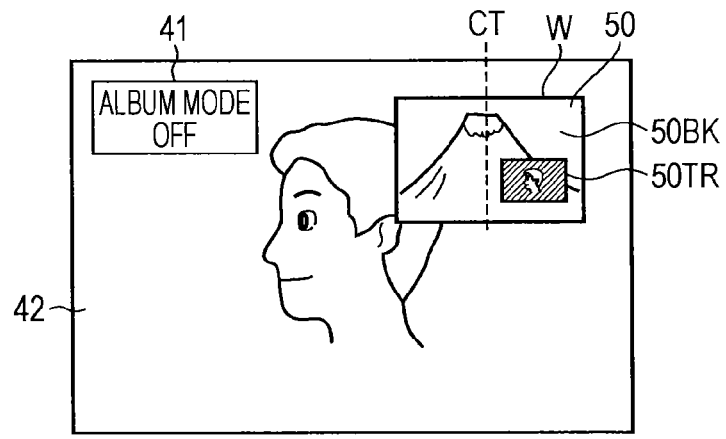

FIG. 11B shows the state displayed on the display unit 6 as the composite image for display 50. The through image 50TR of the composite image for display 50 is arranged on the right side of the center line CT of the composite image for display 50.

In Step F215, the control unit 2 determines a compositing arrangement region of the image in which a face image is not detected based on a predetermined arrangement order decided in a template.

In Step F216 of FIG. 10, the control unit 2 performs a process of making the through image in the data of the composite image for display 50 as a highlighted image so that the user can easily perceive the compositing range of the through image 50TR in the composite image for display 50.

Then, in Step F217, the control unit 2 embeds the composite image for display 50 including the through image as the highlighted image in the through image 42 in the form of PinP (Picture in Picture) and supplies the outcome to the display unit 6 in Step F218.

Accordingly, displays as in, for example, FIGS. 4B, 5B, and 6B are executed.

After that, the control unit 2 executes the processes of Steps F220 to F223 according to the detection of the release operation of Step F219.

When the release operation of the user is detected in the state of FIG. 4B, for example, the release process is performed (F220), a process of recording the still image data is performed, and the captured image is recorded on the recording unit 5 as the still image data Pic002 (FIG. 4C) (F221). At the same time, the thumbnail image and the screen nail image are also recorded.

In addition, in the arrangement state in the composite image for display 50 of FIG. 4B, the captured image of this time is composited on the image for a compositing process 60. In other words, the image for a compositing process 60 is overwritten on the memory unit 3 and updated (F222). In this case, according to the compositing arrangement region (the position and size) of the through image 50TR in the composite image for display 50, images relating to this release process are composited in the image for a compositing process 60. Information indicating the composited images (for example, the file name of the still image data Pic002 recorded in Step F222, and the like) and information of the compositing arrangement region are also stored. For example, software of the tag of the captured image used in the compositing is embedded in EXIF tag. No. OXO131 of (the composite image after) the image for a compositing process.

Step F223 is executed when the background image 60BK has been changed in Steps F205, F210, and the like until then. In other words, when the background image 60BK has been changed, updating and saving of the background image data and the depth information thereof are performed.

By performing the above processes, the control unit 2 executes the operation of generating the composite image described in FIGS. 3A to 7C, and the user can perform a release operation at a certain time point while viewing the composite image for display 50 that includes the through image and imagining the composite image, and perform an operation of adding the image generated at the release time point to the composite image.

In the album mode, the user also can edit the composite image. By user's performance of a certain operation, a polling process of a change in the image for a compositing process 60 occurs in Step F224. Then, the control unit 2 proceeds to Step F225 to make a change (edit) for the image for compositing process 60 according to an input of the user's operation. The control unit 2 detects an instruction of changing the position, size, background image, a similar image to be rejected of each image in the current image for a compositing process 60 so as to change the composite image according to a user's operation.

As a specific operation example, the control unit 2 causes the display unit 6 to display the image for a compositing process 60 at the time in a full size without change. For the image, the user selects an image with an operation on a touch panel, and performs a touch operation such as dragging the image to a position in which they want to move the image or instructing enlargement or reduction of the image. Alternatively, the user performs an operation of dragging a designed image to the trash bin on the screen. Furthermore, the user performs an operation of instructing transposition of the background, or the like, by selecting a background portion and dragging the portion to the frame of the image. In response to the user's operation, the control unit 2 changes the composite image.

For example, by changing the arrangement region (position and size) for the images 60A, 60B, and the like composited with the background image 60BK as in FIG. 7A according to the user's operation, the state of FIG. 7A can be changed to the states of FIGS. 7B and 7C. The same is applied to the process of the album edit mode to be described later, but the reason for setting the processes of Step F224 and F225 is to enable the same process as in the album edit mode to be described below also in the album mode.

When the user operates the album mode off button 41 at a certain time point, the control unit 2 detects a polling process of album mode off in Step F226.

In this case, the control unit 2 finishes the process of FIGS. 9 and 10, that is, the process of Step F109 of FIG. 8.

Then, the control unit 2 determines whether or not there was the composite process in Step F110 of FIG. 8. Whether or not there was the compositing process mentioned here is whether or not the process of Step F222 or Step F225 of FIG. 10 has been performed. When the process of Step F222 or Step F225 is performed even once, the control unit 2 proceeds to Step F111, and records the composite image onto the recording unit 5.

In other words, the image for compositing process 60 saved in the memory unit 3 at the moment is output to the recording unit 5 as a final composite image generated in the album mode this time (process of recording composite image data). Then, the image is recorded as one composite image file Pic-M. In addition, compositing management information is also recorded in association therewith. For example, as information of the background image 60BK, information indicating the image file set with the background image data itself or the background image, and depth information are stored. In addition, as information of the images (60A, 60B, and the like) included in the composite image, for example, information indicating still image data Pic00*x* corresponding to the image and information of the compositing arrangement region (the position and size on the background image) are also stored being included in the compositing management information.

Furthermore, the evaluation value of each image (60BK, 60A, 60B, and the like) in the composite image (evaluation value used in Step F204 of FIG. 9), information of the presence or non-presence of a face image, the orientation of the face, information of the number of persons (face image), and the like may also be included in the compositing management information.

In addition, information indicating a used template may also be included in the compositing management information.

It is needless to say that such compositing management information is useful when a process in the album mode is executed using the composite image next time, and when a process is performed by being transmitted to other devices.

To record the compositing management information, a predetermined region of Exif can be used. For example, a program indicating the arrangement in the album mode is recorded in EOI of Exif.

After recording the composite image data and the compositing management information as above, the control unit 2 finishes the process by setting the album mode to be off in Step F112 (return to Step F102).

In addition, when it is determined that the compositing process was not performed in Step F110, the control unit 2 may return to Step F102 by setting the album mode to be off in Step F112.

As a process in the album mode as above, a modified example as follows is considered.

Figure 12:
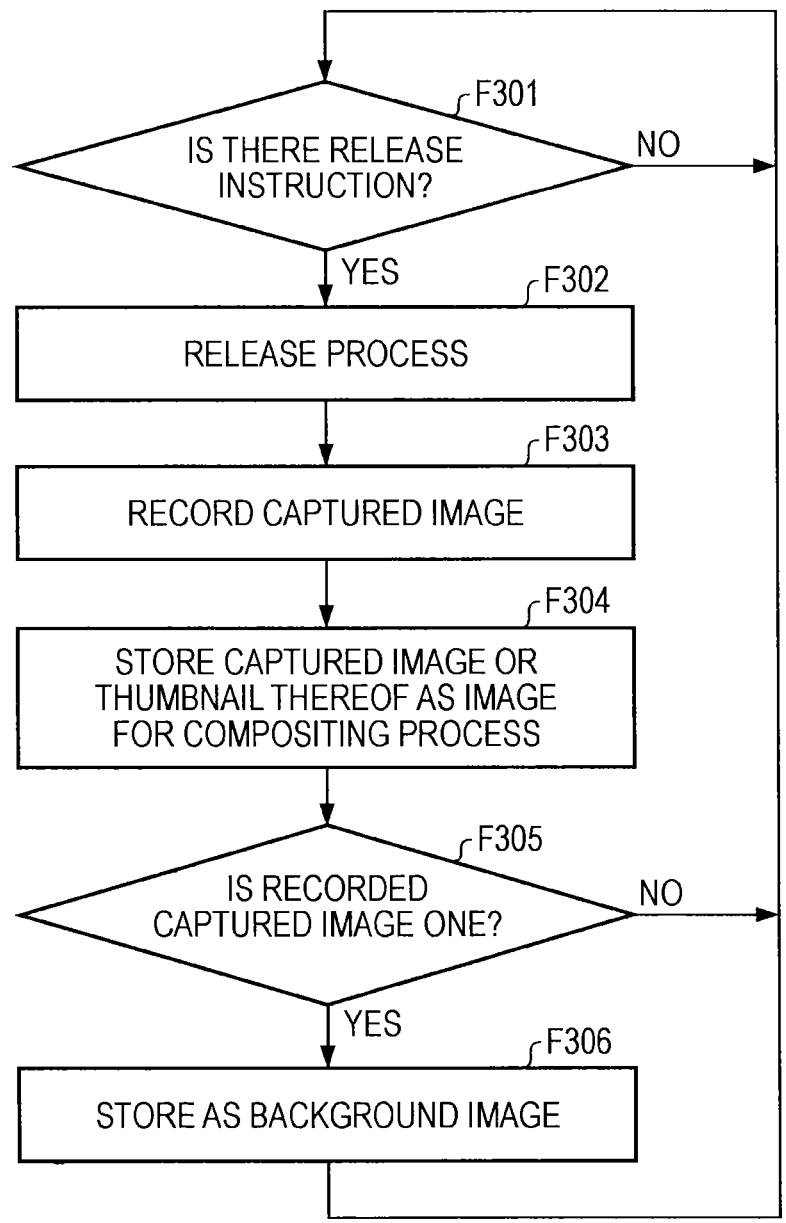
FIG. 12 is a flowchart of a release process based on an interrupt process according to an embodiment of the present disclosure.

In the process shown in FIGS. 9 and 10 above, a process in response to the polling request of a release instruction is performed as Steps F219 to F223, but the process may be executed as an interrupt process, for example, as shown in FIG. 12.

In other words, the process of FIG. 12 is performed at an arbitrary time point among Steps F202 to F218 in FIGS. 9 and 10.

In FIG. 12, the control unit 2 performs a reading process of whether or not there was a polling process of image recording (release) by the operation unit 4 in Step F301.

In Step F302, the control unit 2 performs a release process.

In Step F303, the control unit 2 records a captured image (records a still image data) on the recording unit 5.

In Step F304, the control unit 2 composites the still image data that is captured and recorded and a thumbnail thereof with the image for a compositing process, and saves the result in the memory unit 3. In addition, information of the still image data used in the compositing is also saved in the memory unit 3.

In Step F305, the control unit 2 checks whether or not the number of images saved in the memory unit 3 is one. In other words, the control unit 2 checks whether or not the image for a compositing process 60 is only the image stored this time (in the state in which a plurality of images have not been composited yet).

When the image for a compositing process 60 includes one image, the control unit sets the image as the background image 60BK in Step F306. In addition, information relating to the background image 60BK (background image data itself, the thumbnail image, depth information, and the like) is also saved.

In the process in the album mode of FIGS. 9 and 10, using the interrupt process as above, a process in response to the release instruction may be performed.

According to the process in the album mode of the embodiment described in FIGS. 8, 9, 10, and 12, the following effects are obtained.

First, a user can check an image obtained by compositing an image captured in a different angle of view with a current through image in real time by displaying in the through image in the form of PinP. Imaging can be performed while imagining a composite image generated accordingly, and the creation of the composite image that the user desires becomes easy.

In addition, when the image that was imaged and recorded in the past is similar to the through image, it is possible to prevent an unnecessary photo from being used in compositing by automatically selecting one image and compositing.

In addition, labor of editing can be reduced by detecting the depth of the images, and setting an image with the deepest depth to be the background image, and a composite image of a higher quality can be obtained.

In addition, by changing the size of the images putting the priority on the images based on evaluation values of each image that was captured and recorded in the past and the through image, a composite image with effective contrast can be created.

In addition, by detecting the orientation of a person's face and automatically arranging the orientation of the face to face the center of the image, a balanced composite image can be created.

In addition, by having a plurality of templates that determines the arrangement of the image and selecting one by the user using the operation unit 4, the arrangement of the images adaptive to the imaging scene becomes easy and a composite image that further matches the situation can be created.

In addition, by performing emphasized display such as display with highlight so as to easily perceive the composited region of the through image 50TR in the composite image for display 50, the visibility of the through image 50TR in the composite image for display 50 can improve.

In addition, by using a low-resolution image such as a thumbnail image, a screen nail image, or the like, not using the main image in an image process in the album mode (generation process of the composite image for display 50), the processing speed can be raised.

In addition, the compositing management information used in the process in associated with the image is stored in the memory unit 3, or recorded in the recording unit 5 in association with the composite image. Accordingly, imaging in the album mode can be rapidly resumed, for example, even after power is disconnected in the middle of imaging in the album mode. In addition, in a process in the album mode using a composite image that was recorded in the past, the compositing management information can be effectively used, and additional compositing with a composite image that was created in the past also becomes easy.

4. Album Edit Mode Process

A composite image can be created based on an operation in the album mode described above, but the arrangement and size of an image to be composited on a background image during imaging are automatically set to some extent through a process in accordance with a template and a face image. From the automatic process, a user gains an advantage of creating a composite image while very easily performing imaging, but on the other hand, there are users who want to arrange images or setting background images according further to their preference.

Therefore, the album edit mode is prepared. Even during the album mode described above, an edit operation of a user can be further executed as Steps F224 and 225 of FIG. 10.

The process in the album edit mode shown in FIG. 8 will be described.

As described above, by performing an operation of instructing the album edit mode by the user in an imaging mode, the control unit 2 recognizes the polling request of the album edit mode on in Step F113. In this case, the control unit 2 performs the processes of Step F114 to F120.

When there was a request of a polling process of the album edit mode on in Step F113, the control unit 2 selects a composite image to be edited in Step F114. For example, the control unit 2 displays a list of composite images recorded on the recording unit 5, and demands a selection input from the user. Then, the control unit sets a composite image designated by the user to be a composite image to be edited.

Then, the selected composite image is read from the recording unit 5 to the memory unit 3.

In Step F115, the control unit 2 performs a composite image change process on the memory unit 3 according to the instruction of the user input from the operation unit 4.

FIGS. 7B and 7C show examples of edit operations. When the composite image of FIG. 7A is selected as an object to be edited, the user is assumed to perform an operation of changing the position and the size of the images 60A and 60C. The control unit 2 edits the composite image according to the operation, and changes the image to the composite image like, for example, FIG. 7B.

In addition, when the composite image of FIG. 7A is selected as an object to be edited, the user performs an operation of setting the image 60C to be a background image. According to the operation, the control unit 2 edits the composite image so that the original image 60C is set to be the background image 60BK and the original background image 60BK is set to be the image 60C, as shown in FIG. 7C.

In addition to the example, for example, an image designated by the user can be deleted from the composite image.

Specifically, as in the process of changing the image for a compositing process in the album mode described above, for example, the control unit 2 causes the composite image to be edited to be displayed on the display unit 6. From the display, the user selects an image within the composite image through a touch panel operation, and performs a drag operation to a position desired to be moved and a touch operation for instructing enlargement or reduction. Alternatively, an operation of dragging a designated image to the trash bin on the screen is performed. Further, an operation of instruction the transposition of the background is performed by selecting the background portion and dragging the portion to the frame of an image. In response to the user operations, the control unit 2 edits the composite image.

Such composite image editing is performed in the process of Step F115.

After performing a desired edit operation, the user performs an operation of setting the album edit mode to be off. The control unit 2 reads whether or not there was a request of a polling process of the album edit mode off in Step F116, and when there was a polling process of the album edit mode off, the control unit proceeds to Step F117. Then, the control unit checks whether or not there was any change in the composite image.

Even in the album edit mode, if there is no change added to the composite image such as in the album edit mode off without a user's operation of instructing particularly any change, the control unit 2 finishes the process by setting to the album edit mode off in Step F120, and returns to Step F102.

On the other hand, in the process of Step F115, when any change is added to the composite image, the control unit 2 proceeds to Step F118, and records the composite image edited on the memory unit 3 onto the recording unit 5. In other words, the composite image recorded on the recording unit 5 is updated. Then, in Step F120, the process ends with the album edit mode off, and returns to Step F102.

By performing the process of the album edit mode as above, the user can instruct the position, size, background image, and similar image to be rejected in the composite image using the operation unit 4, and change the composite image according to his or her own intension.

For example, the composite image can be easily created during imaging, and after that, the layout of the composite image can be changed and the background image can be replaced according to the user's preference.

Even in the album mode described above, an edit operation of the user can be executed as Step F225 of FIG. 10. Step F225 of FIG. 10 is the same as Step F115 in the album edit mode of FIG. 8. The difference is only that an image to be edited is the image for a compositing process 60 that has not been recorded yet.

Therefore, even when imaging is performed in the album mode, the user can arbitrarily designate the content of a composite image.

5. Modification Example of Imaging Device

Hereinabove, embodiments applied to the imaging device 1 are described, but various modification examples in terms of the configuration of the imaging device 1, a display form in the album mode, and a form of a composite image are considered.

Figure 13:
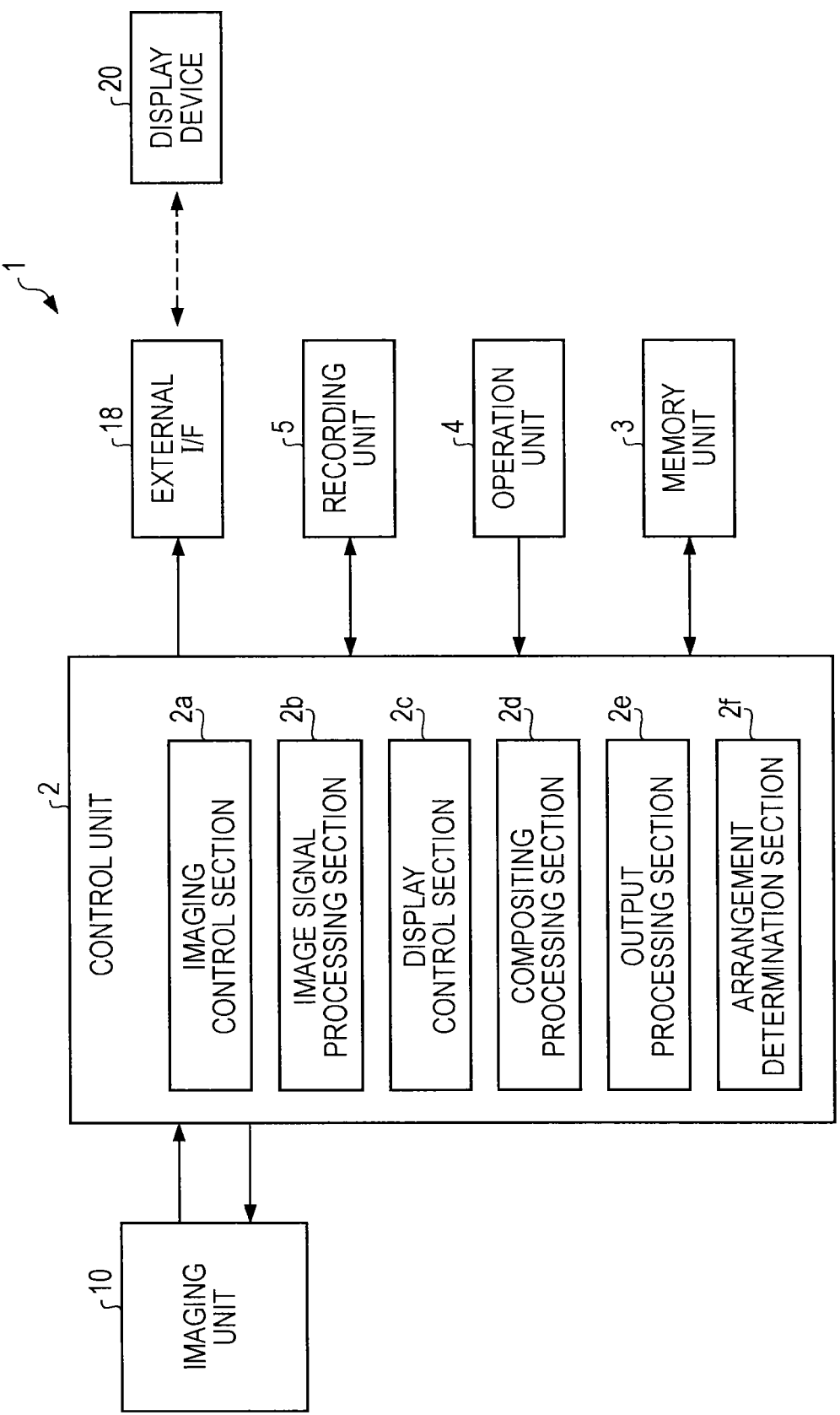
FIG. 13 is a block diagram of another configuration example of an imaging device according to an embodiment of the present disclosure.

FIG. 13 shows another configuration example of the imaging device 1. The same reference numerals are given to the same portions as those in FIG. 1, and description thereof will be omitted.

In this example, the imaging device 1 does not include the display unit 6, but has an external interface 18. Thus, the imaging device has communication connection with an external display device 20 via the external interface 18.

The external interface 18 performs various wired or wireless data communications with an external device (display device 20) including a display device such as a personal computer system, a television receiver, or a mobile terminal device.

The imaging device 1 transfers display data such as the composite image for display 50, or the like to an external device through communication with the external device using the external interface 18, or can be input with various kinds of information from the external device.

In such a case, the control unit 2 transmits display data obtained by compositing the through image 42 with the composite image for display 50 in the album mode to the display device 20. Then, the image of the data is displayed on the display device 20.

The operation of the album mode described above is realized also in this form.

Of course, the imaging device 1 having the display unit 6 as in FIG. 1 may includes the external interface 18, and the through image 42 composited with the composite image for display 50 may be displayed on the external display device 20.

Figure 14:
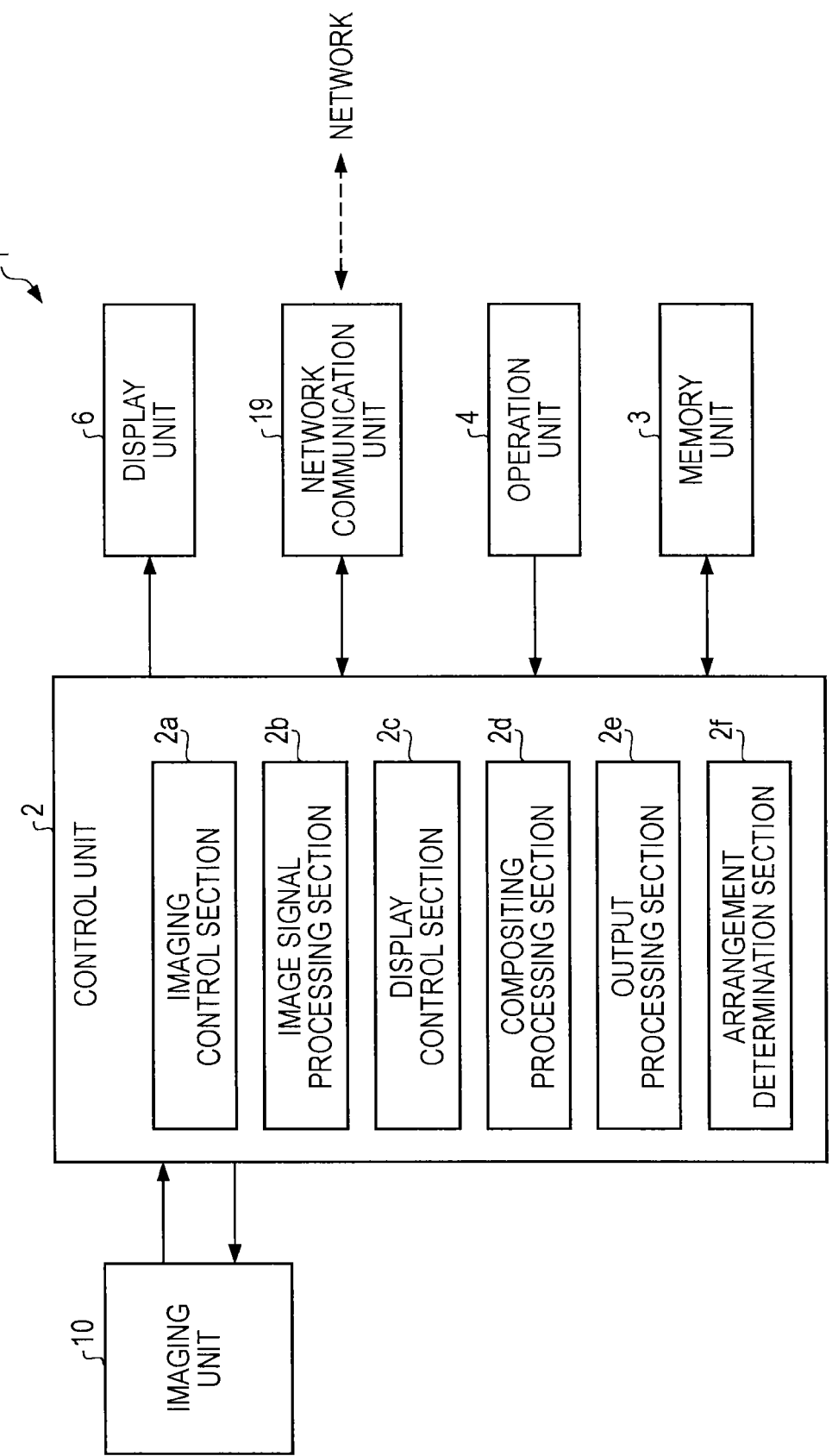
FIG. 14 a block diagram of still another configuration example of an imaging device according to an embodiment of the present disclosure.

FIG. 14 also shows another configuration example of the imaging device 1. The same reference numerals are given to the same portions as those in FIG. 1, and description thereof will be omitted.

This is an example of the imaging device 1 that does not include the recording unit 5. The imaging device 1 in this case has a network communication unit 19.

The network communication unit 19 performs communication through various kinds of networks, for example, the Internet, a home network, a LAN (Local Area Network), or the like. The control unit 2 can perform various kinds of data communication with a server, a terminal, or the like on a network through the network communication unit 19.

In this case, the control unit 2 can perform an operation of further adding compositing using still image data downloaded through the network communication unit 19, composite image data of the past, or the like, in the album mode. In other words, selection of an image, reading of image data, or the like in Steps F107 and F108 of FIG. 8 can be executed for an image on a network.

Therefore, a user can select a still image or a composite image provided on the Internet and permitted to use and further add compositing to the image in the album mode.

In addition, in this configuration, a process of transmitting composite image data is executed. For example, a created composite image can be transmitted to an external server, or the like via the network communication unit 19 so as to be recorded thereon. In other words, by performing a process of transmitting composite image data, the composite image can be uploaded on a server, or the like, on a network.

Of course, the imaging device may include the network communication unit 19 in addition to the recording unit 5 of FIG. 1.

In addition, including the external interface 18 as in FIG. 13, the imaging device can be input with an image to be used in the album mode from a connected external device, or transmit created composite image data to an external device as a process of transmitting composite image data so as to be recorded thereon.

Figure 15A:
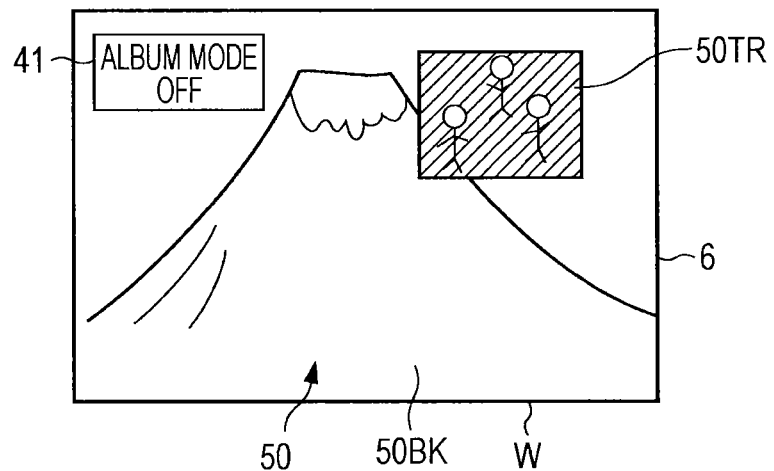
FIGS. 15A and 15B are illustrative diagram of a modification example of a display image according to an embodiment of the present disclosure.
Figure 15B:
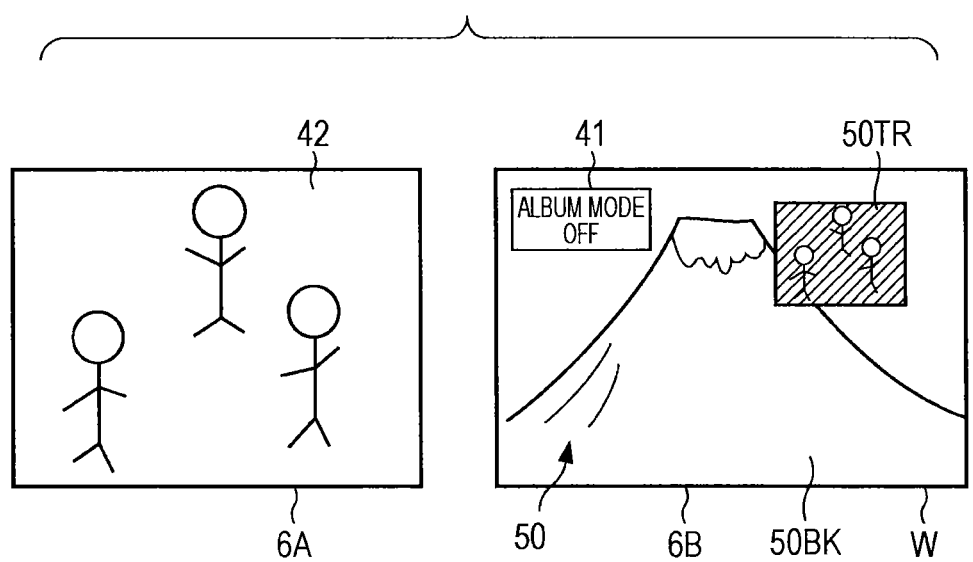

Next, FIGS. 15A and 15B show another example as a display form including the composite image for display 50 to be displayed in the album mode.

In the example described above using FIGS. 3A to 6C, the composite image for display 50 is displayed on the display unit 6 by being composited in a portion of the through image 42.

However, since the through image 50TR is included in the composite image for display 50, only the composite image for display 50 may be displayed on the display unit 6. This is shown in FIG. 15A.

FIG. 15A shows an example in which the entire screen of the display unit 6 is set to be the composite image frame for display W, and the composite image for display 50 is shown. The user is necessary to view the through image in order to determine a subject, and in order to do this, the through image 50TR composited on the background image 50BK of the composite image for display 50 may be viewed.

In this manner, the control unit 2 may cause to only display the composite image for display 50 including the through image 50TR for a display in the album mode.

Accordingly, the user can more clearly perceive the image of a composite image being created.

Next, FIG. 15B is an example in which there are two display units 6A and 6B. For example, it is a case in which the imaging device 1 includes two display units 6A and 6B. Alternatively, it may be assumed that two display screens are provided for the display device 20 as an external device as shown in FIG. 13. Further, it is also assumed that the imaging device 1 includes the display unit 6 and is connected to the display device 20 via the external interface 18 as shown in FIG. 13.

It is considered that, in a situation in which a user can view two display units 6A and 6B during imaging in the album mode, the control unit 2 causes the through image 42 to be displayed on the display unit 6A and only the composite image for display 50 including the through image 50TR to be displayed on the display unit 6B as shown in FIG. 15B. The entire screen of the display unit 6B is set to be the composite image frame for display W, and displays an image obtained by compositing the through image 50TR on the background image 50BK as the composite image for display 50.

In this manner, the user can perceive both of the through image 42 and the composite image for display 50 with high resolution in the album mode.

Figure 16A:
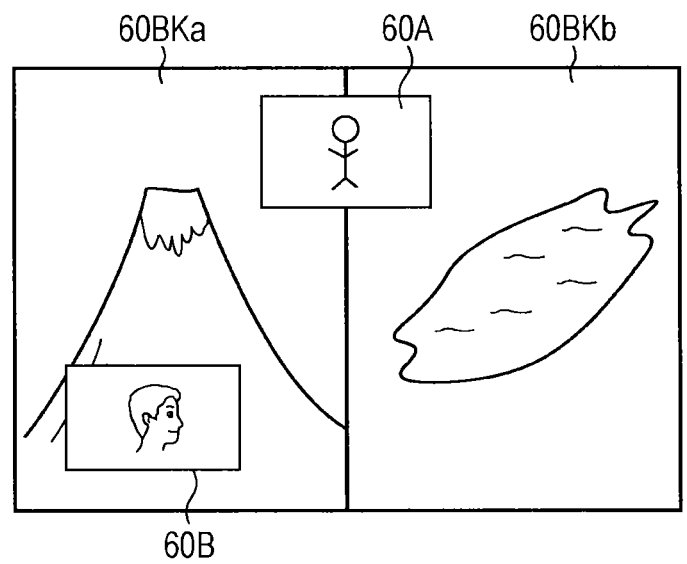
FIGS. 16A and 16B are illustrative diagram of another example of a composite image according to an embodiment of the present disclosure.
Figure 16B:
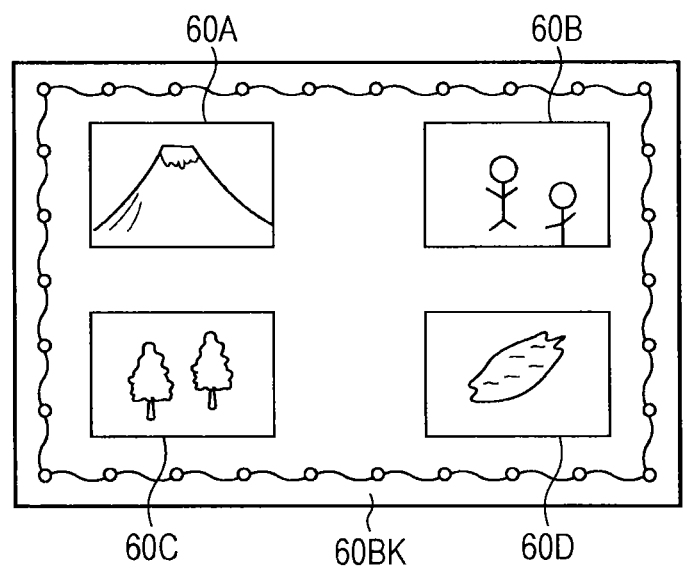

Next, FIGS. 16A and 16B show modification examples of a background image.

In the example described above, the background image 60BK in the composite image is set with one still image. However, a plurality of still images may be set as background images.

FIG. 16A is an example of a composite image in which two background images 60BKa and 60BKb are set and other images 60A and 60B are composited thereon.

When a user selects a plurality of recorded still image data pieces in Step F107 of FIG. 8, for example, the plurality of background images 60BKa and 60BKb are arranged and used in a composite process.

Alternatively, in an automatic process in the album mode, the control unit 2 may perform a process of arranging two images having deeper depth information as background image.

In addition, FIG. 16B is an example in which images that are not captured images but already recorded are set as background images 60BK. For example, pattern image, animations, images, and the like are recorded on the recording unit 5 (or acquired from downloading, or the like), and a user selects arbitrary background images therefrom.

Accordingly, in the album mode, a selected pattern image, or the like is set as the background image 60BK, and captured images 60A, 60B, 60C, 60D, and the like are composited thereon.

By setting background images in this manner, more diversified composite images can be generated.

Hereinabove, various modification examples are described, but other modification examples are considered in addition to them.

In a process in the album mode, general still image data (the above-described image file Pic001, or the like) is also recorded by a release operation, but a process of not recording a general still image in the album mode is also considered.

In addition, when still image data is recorded in response to a release operation in the album mode, an example in which a low-resolution image such as a thumbnail image, a screen nail image, or the like is not recorded is also considered.

In addition, a low-resolution image is set to be used in a compositing process for the composite image for display 50, but the compositing process may be performed in the state of an image with high resolution generally obtained as a captured image.

6. Application Example in Information Processing Device and Program

In the embodiments, the imaging device 1 including the image processing device referred in the claims is exemplified, but the image processing device of the present disclosure can be realized in various devices without being limited to a so-called digital still camera.

The technology of the present disclosure can be applied to, for example, a mobile telephone with an imaging function, a video camera device, a mobile terminal device, and other kinds of devices.

Further, the image processing device of the present disclosure can be realized with an information processing device not having an imaging function, for example, a personal computer, a mobile telephone, a mobile terminal device, an image device, or the like.

FIG. 17 is a block diagram of an image processing device 80 as an information processing device not having an imaging function according to an embodiment of the present disclosure.

The image processing device 80 includes an image input unit 81, a control unit 82, a memory unit 83, an operation unit 84, a recording unit 85, and a display unit 86.

The image input unit 81 receives and is input with a captured image signal (captured image data) from an external imaging device 70 that can perform data communication through wired or wireless communication.

The display unit 86 performs various displays for a user in the same manner as the display unit 6 of FIG. 1.

The operation unit 84 functions as input means of inputting a user's operation and sends a signal to the control unit 82 according to the input operation in the same manner as the operation unit 4 of FIG. 1.

The recording unit 85 includes, for example, a non-volatile memory, an HDD, or the like, and functions as a storage region storing image files (content files) of still image data, moving image data, and the like, attribute information of the image files, thumbnail image, and the like, in the same manner as the recording unit 5 of FIG. 1. With regard to a composite image, compositing management information is also recorded thereon in the form of Exif data, or the like.

The memory unit 83 collectively refers to a ROM, a RAM, a flash memory, and the like, as the memory unit 3 of FIG. 1 does, and is used as a work area of the control unit 82 or to store application programs, and the like.

The control unit 82 serves as an operation processing device such as a CPU, and includes an image signal processing section 82$b$, a display control section 82$c$, a compositing processing section 82$d$, an output processing section 82$e$, and an arrangement determination section 82$f$ as functions realized by software. The sections are the same as the image signal processing section 2$b$, the display control section 2$c$, the compositing processing section 2$d$, the output processing section 2$e$, and the arrangement determination section 2$f$ of FIG. 1.

In the image processing device 80 of this configuration, while being input with image data captured by the external imaging device 70, the same operation as that described above for the imaging device 1 is realized by the control unit 82 executing the album mode process and the album edit mode process described above.

For example, a user can easily execute the creation of a composite image by performing imaging using the imaging device 70 and the separate image processing device 80.

Also in the case of the image processing device 80 of FIG. 17, it is possible to use the external display device 20 by providing the external interface 18, or to input still image data from an external device as described in FIG. 13. In addition, as described in FIG. 14, by providing the network communication unit 19, it is also possible to download image data from a network or upload a composite image.

A program according to an embodiment is a program that causes an operation processing device such as a CPU to execute the album mode process and the album edit mode process described above.

In other words, the program causes an operation processing device to generate a composite image for display including a through image generated from a captured image signal obtained by performing photoelectric conversion for light incident from a subject and to display the composite image for display on an image for a compositing process.

In addition, the program causes the operation processing device to execute a process of compositing a captured image signal according to a recording timing in an image for a compositing process according to a compositing arrangement state of a through image in a composite image for display.

In addition, the program causes the operation processing device to execute a process of outputting an image for a compositing process at a certain time point such as a release time point as generated composite image data.

In addition, the program causes the operation processing device to execute an edit process of changing the content of an image in composite image data according to an operation input.

Using the program, it is possible to realize a device that executes the album mode process and the album edit mode process described above by the operation processing device.

The program can be recorded in advance on an HDD as a recording medium included in a device such as a computer device, an imaging device, or the like or a ROM in a microcomputer having a CPU.

Alternatively, the program can be temporarily or permanently stored (recorded) on a removable recording medium such as a flexible disk, a CO-ROM (Compact Disc Read Only Memory), an MO (Magneto Optical) disc, a DVD (Digital Versatile Disc), a Blu-Ray disc, a magnetic disk, a semiconductor memory, or a memory card. Such a removable recording medium can be provided as so-called package software.

In addition, the program can be installed in a personal computer, or the like from a removable recording medium, or downloaded from a download site via a network such as a LAN (Local Area Network), or the Internet.

In addition, the program is suitable to be widely provided to an imaging device or an image processing device that executes operations in the album mode and the album edit mode for generating composite images.

The present technology can also employ the following configurations.

(1) An image processing device which includes a composite processing unit that generates a composite image for display by including a through image generated based on a captured image signal obtained by performing photoelectric conversion for light incident from a subject in an image for a compositing process, and composites a captured image of a recording time point in the image for a compositing process in accordance with a compositing arrangement state of the through image in the composite image for display, and a display control unit that performs display control for the composite image for display.

(2) The image processing device described in (1) above which further includes an arrangement determination unit that determines an arrangement state of the through image within the image for a compositing process according to the content of the captured image signal, in which the composite processing unit composites the through image on the image for a compositing process in an arrangement state determined by the arrangement determination unit so as to generate the composite image for display.

(3) The image processing device described in (2) above in which, according to an arranged image which has already been arranged in the image for a compositing process, the arrangement determination unit further determines an arrangement state of the through image and the arranged image within the image for a compositing process.

(4) The image processing device described in any one of (1) to (3) above in which the display control unit performs a process of causing the through image to be displayed and the composite image for display that has been composited with the through image to be displayed.

(5) The image processing device described in any one of (1) to (4) above in which the image for a compositing process is an image obtained by setting a still image to be a background image, and the composite processing unit sets a still image obtained from imaging or a still image read from a recording medium to be a background image in the image for a compositing process.

(6) The image processing device described in any one of (1) to (5) above in which the composite processing unit sets a composite image read from a recording medium to be the image for a compositing process.

(7) The image processing device described in any one of (1) to (6) above in which the image for a compositing process is an image at least including a background image, and the composite processing unit performs a process of changing the background image based on a result of a comparison process between the through image and the background image.

(8) The image processing device described in (7) above in which the comparison process is at least one of a comparison process for obtaining the similarity between images, a comparison process of image evaluation values, and a comparison process of image depth.

(9) The image processing device described in any one of (1) to (8) above in which the image for a compositing process is an image at least including a background image, the composite processing unit generates the composite image for display by compositing the through image in a compositing arrangement region set on the background image of the image for a compositing process and the compositing arrangement region on the background image in the image for a compositing process is set based on template information.

(10) The image processing device described in (2) or (3) above in which the image for a compositing process is an image at least including a background image, the composite processing unit generates the composite image for display by compositing the through image in a compositing arrangement region set on the background image of the image for a compositing process by the arrangement determination unit, and when a face image of a person is included in an image other than the background image included in the image for a compositing process or the through image, the arrangement determination unit determines the orientation of the face in the face image, and sets a compositing arrangement region on the background image in the image for a compositing process using the determination result.

(11) The image processing device described in any one of (2), (3), or (10) above in which the image for a compositing process is an image at least including a background image, and the composite processing unit generates the composite image for display by compositing the through image in a compositing arrangement region set on the background image of the image for a compositing process by the arrangement determination unit and performs the generation of the composite image for display using a low-resolution image.

(12) The image processing device described in any one of (1) to (11) above in which the image for a compositing process is an image at least including a background image, and the composite processing unit composites the through image on the background image of the image for the compositing process, and generates the composite image for display by displaying the region of the through image to be further emphasized than other region.

(13) The image processing device described in any one of (1) to (12) above which further includes an output processing unit that outputs the image for a compositing process at a certain time point as generated composite image data, in which the composite processing unit starts generating the composite image for display according to an instruction of a composite imaging mode, and the output processing unit outputs the image for a compositing process at the time when it is instructed to end the composite imaging mode, as generated composite image data.

(14) The image processing device described in any one of (1) to (13) above which further includes a recording unit that records data on a recording medium and an output processing unit that outputs the image for a compositing process at a certain time point as generated composite image data, in which the output processing unit controls recording of the generated composite image data on a recording medium.

(15) The image processing device described in (14) above, in which the output processing unit further controls compositing management information including information relating to the background image of composite image data to be recorded on a recording medium in association with the composite image data.

(16) The image processing device described in any one of (1) to (15) above which further includes a transmission unit that transmits data to an external device, and an output processing unit that outputs the image for a compositing process at a certain time point as generated composite image data, in which the output processing unit controls the generated composite image data to be transmitted and output from the transmission unit.

(17) The image processing device described in any one of (1) to (16) above which further includes a display unit, in which the display control unit controls the composite image for display to be displayed on the display unit.

(18) The image processing device described in any one of (1) to (17) above in which the composite processing unit performs an edit process of changing the content of an image in composite image data according to an operation input.

The present disclosure contains subject matter related to that disclosed in Japanese Priority Patent Application JP 2011-279199 filed in the Japan Patent Office on Dec. 21, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   a composite processing unit that generates a composite image for display by including a through image, generated based on a captured image signal obtained by performing photoelectric conversion for light incident from a subject, in a recorded image for a compositing process and composites a captured image of a recording time point in the recorded image for the compositing process in accordance with an arrangement state of the through image in the composite image for display,
   wherein the recorded image is set as a background image in the composite image,
   wherein the composite processing unit performs a process of changing the background image based on a result of a comparison process between the through image and the background image, wherein the comparison process is a comparison process of image depth; and
   a display control unit that performs display control for the composite image for display.

2. The image processing device according to claim 1, further comprising:
   an arrangement determination unit that determines the arrangement state of the through image within the recorded image for the compositing process according to content of the captured image signal,
   wherein the composite processing unit composites the through image on the recorded image for the compositing process in the arrangement state determined by the arrangement determination unit so as to generate the composite image for display.

3. The image processing device according to claim 2, wherein, according to an arranged image which has already been arranged in the recorded image for the compositing process, the arrangement determination unit further determines the arrangement state of the through image and the arranged image within the recorded image for the compositing process.

4. The image processing device according to claim 2, wherein
   the composite processing unit generates the composite image for display by compositing the through image in a compositing arrangement region set on the background image for the compositing process by the arrangement determination unit, and
   when a face image of a person is included in an image other than the background image for the compositing process or the through image, the arrangement determination unit determines an orientation of the face in the face image, and sets the compositing arrangement region on the background image for the compositing process using the determination result.

5. The image processing device according to claim 2, wherein
   the composite processing unit generates the composite image for display by compositing the through image in a compositing arrangement region set on the background image for the compositing process by the arrangement determination unit and performs the generation of the composite image for display using a low-resolution image.

6. The image processing device according to claim 1, wherein the display control unit performs a process of causing the through image to be displayed and the composite image for display.

7. The image processing device according to claim 1, wherein the composite processing unit sets another composite image read from a recording medium to be the recorded image for the compositing process.

8. The image processing device according to claim 1, wherein
   the composite processing unit generates the composite image for display by compositing the through image in a compositing arrangement region set on the background image for the compositing process and sets the compositing arrangement region on the background image for the compositing process based on template information.

9. The image processing device according to claim 1, wherein
   the composite processing unit composites the through image on the background image for the compositing process, and generates the composite image for display by displaying a region of the through image to be further emphasized than any other region.

10. The image processing device according to claim 1, further comprising:
    an output processing unit that outputs the recorded image for the compositing process at a certain time point as generated composite image data,
    wherein the composite processing unit starts generating the composite image for display according to an instruction of a composite imaging mode, and
    the output processing unit outputs the recorded image for the compositing process when it is instructed to end the composite imaging mode, as generated composite image data.

11. The image processing device according to claim 1, further comprising:
    a recording unit that records data on a recording medium; and
    an output processing unit that outputs the recorded image for the compositing process at a certain time point as generated composite image data,
    wherein the output processing unit controls recording of the generated composite image data on the recording medium.

12. The image processing device according to claim 11, wherein the output processing unit further controls compositing management information including information relating to the background image of composite image data to be recorded on the recording medium in association with the composite image data.

13. The image processing device according to claim 1, further comprising:
    a transmission unit that transmits data to an external device; and an output processing unit that outputs the recorded image for the compositing process at a certain time point as generated composite image data, wherein the output processing unit controls the generated composite image data to be transmitted and output from the transmission unit.

14. The image processing device according to claim 1, further comprising:

a display unit, wherein the display control unit controls the composite image for display to be displayed on the display unit.

15. The image processing device according to claim 1, wherein the composite processing unit performs an edit process of changing content of an image in composite image data according to an operation input.

16. An image processing method comprising:

displaying a composite image for display by generating the composite image for display by including a through image, generated based on a captured image signal obtained by performing photoelectric conversion for light incident from a subject, in a recorded image for a compositing process, wherein the recorded image is set as a background image in the composite image;

compositing a captured image of a recording time point in the recorded image for the compositing process in accordance with a compositing arrangement state of the through image in the composite image for display; and performing a process of changing the background image based on a result of a comparison process between the through image and the background image, wherein the comparison process is a comparison process of image depth.

17. A non-transitory computer-readable storage medium having stored thereon, a set of computer-executable instructions, for causing a computer to perform steps comprising:

displaying a composite image for display by generating the composite image for display by including a through image, generated based on a captured image signal obtained by performing photoelectric conversion for light incident from a subject, in a recorded image for a compositing process, wherein the recorded image is set as a background image in the composite image;

compositing a captured image of a recording time point in the recorded image for the compositing process in accordance with a compositing arrangement state of the through image in the composite image for display; and performing a process of changing the background image based on a result of a comparison process between the through image and the background image, wherein the comparison process is a comparison process of image depth.

\* \* \* \* \*